United States Patent
Terui et al.

(10) Patent No.: US 8,822,588 B2
(45) Date of Patent: *Sep. 2, 2014

(54) FLUORINE-CONTAINING POLYMER AND ANTI-STATIC AGENT WHEREIN SAME IS USED

(75) Inventors: Yoshiharu Terui, Fujimino (JP); Haruhiko Komoriya, Iruma-gun (JP); Susumu Inoue, Kawasaki (JP); Takashi Kume, Kawagoe (JP)

(73) Assignee: Central Glass Company, Limited, Ube-shi (JP)

( * ) Notice: Subject to any disclaimer, the term of this patent is extended or adjusted under 35 U.S.C. 154(b) by 524 days.

This patent is subject to a terminal disclaimer.

(21) Appl. No.: 12/992,035

(22) PCT Filed: Jun. 10, 2009

(86) PCT No.: PCT/JP2009/060608
§ 371 (c)(1),
(2), (4) Date: Nov. 10, 2010

(87) PCT Pub. No.: WO2009/151074
PCT Pub. Date: Dec. 17, 2009

(65) Prior Publication Data
US 2011/0065857 A1 Mar. 17, 2011

(30) Foreign Application Priority Data

Jun. 12, 2008 (JP) ................................ 2008-154203
Jun. 1, 2009 (JP) ................................ 2009-132603

(51) Int. Cl.
C08F 20/28 (2006.01)

(52) U.S. Cl.
USPC ........... 524/544; 526/242; 526/243; 526/245; 526/248; 428/421; 428/442

(58) Field of Classification Search
USPC ................. 428/442; 526/242, 243, 245, 248; 524/544; 560/222, 223
See application file for complete search history.

(56) References Cited

U.S. PATENT DOCUMENTS

| | | | |
|---|---|---|---|
| 2,732,398 A * | 1/1956 | Brice et al. | 562/30 |
| 3,532,659 A * | 10/1970 | Hager et al. | 524/805 |
| 3,704,311 A | 11/1972 | Koshar | |
| 4,617,163 A * | 10/1986 | Smith | 264/235.6 |
| 5,446,134 A | 8/1995 | Armand et al. | |
| 5,463,005 A * | 10/1995 | Desmarteau | 526/240 |
| 5,696,224 A | 12/1997 | Benrabah et al. | |
| 2002/0045713 A1 | 4/2002 | Feiring et al. | |
| 2008/0114110 A1 | 5/2008 | Lee et al. | |

FOREIGN PATENT DOCUMENTS

| | | |
|---|---|---|
| JP | 11-260407 A | 9/1999 |
| JP | 2002-505356 A | 2/2002 |
| JP | 2007-9042 A | 1/2007 |
| WO | WO 99/45048 A1 | 9/1999 |

OTHER PUBLICATIONS

R. J. Koshar, et al., "Bis(perfluoroalkylsulfonyl)methanes and Related Disulfones" Journal of Organic Chemistry 1973, pp. 3358-3363, vol. 38, No. 19, U.S.
International Search Report including English language translation dated Sep. 15, 2009 and PCT/ISA/237 Form (Eight (8) pages).
European Search Report dated Apr. 21, 2011 (Six (6) pages).

* cited by examiner

Primary Examiner — Nicole M Buie-Hatcher
(74) Attorney, Agent, or Firm — Crowell & Moring LLP

(57) ABSTRACT

A fluorine-containing polymer has a repeating unit of the general formula (2) and is produced by homopolymerization or copolymerization with another polymerizable double bond-containing monomer.

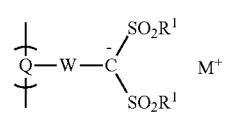

(2)

In general formula (2), W represents a linking group; $R^1$ each independently represents a perfluoroalkyl group; Q represents a unit structure formed by cleavage of a double bond of a polymerizable double bond-containing group; and $M^+$ represents a hydrogen cation, a metal ion or a quaternary ammonium ion.

9 Claims, No Drawings

FLUORINE-CONTAINING POLYMER AND ANTI-STATIC AGENT WHEREIN SAME IS USED

TECHNICAL FIELD

The present invention relates to an antistatic agent containing a fluorine-containing polymer as a component.

BACKGROUND ART

In general, molded articles such as plastic, glass and wafer are easily charged by friction etc. because of high electrical resistance, whereby there arise problems that: the charged article causes deterioration in appearance, such as dirt or damage, due to the attraction of dust and the like; an electric shock occurs upon contact of a human body with the charged article; and a defective occurs in the article during manufacturing process.

In order to solve these problems, it is common practice to impart antistatic performance to the molded articles. Some techniques for imparting antistatic performance to the molded articles are known, including (1) the addition of a surfactant to the inside of the molded article; (2) the application of a surfactant or silicon compound to a surface of the molded article; and (3) the modification of a surface of the molded article by a plasma treatment.

In the technique (1), however, there may occur decomposition of the molded article, or separation of a part of the molded article, during molding, and phase separation of the surfactant in the molded article over time. In the technique (2), the antistatic performance can be imparted to the molded article with the application of a small amount of the surfactant but may be easily lost by washing with water or by friction. There is also a need in the technique (2) to apply the surfactant separately after molding the resin product.

It is known that a so-called inner-type antistatic agent added to a plastic resin etc. of the article in the technique (1) has at a surface thereof an active group capable of exerting an antistatic effect and, upon decrease of the active group by friction, dirt or the like, regenerates the active group from the inside to maintain the antistatic effect permanently. As the inner-type antistatic agent can be used by mixing or dispersing into raw material of the plastic resin before polymerization, or into the plastic resin before molding, the use of such an inner-type antistatic agent leads to simplification of manufacturing process. In the case of a non-ionic surfactant, however, it is necessary to use a large amount of the non-ionic surfactant in order to impart antistatic performance. This results in a drawback that the surface properties of the article become deteriorated. In the case of an ionic surfactant, it may be possible to impart antistatic performance even by a relatively small amount of the ionic surfactant. The ionic surfactant does not however get dissolved uniformly and transparently and, even if dissolved temporarily, causes phase separation over time to thereby generate an insoluble matter. Any suitable surfactant has not been found.

By contrast, there is an advantage in the technique (2), in which the surfactant is applied to the surface of the molded article, that the molded article of the plastic resin for use as a substrate does not impair its physical properties and can attain good antistatic performance even by a small amount of the surfactant. The original beautiful appearance of the plastic resin molded article may however become deteriorated in the technique (2). Further, the antistatic effect of the surfactant cannot be regenerated when once lost by friction, washing with water or dissolution etc. It is thus necessary to form a polymer coating or a cured film thereof in order to maintain the antistatic effect of the surfactant over a long time except for the case where it is enough to exert the antistatic effect for a long time during manufacturing.

Although not only antistatic performance but also transparency and evenness are recently often required for various products such as optical discs and videotapes and workpieces in semiconductor manufacturing processes, none of the articles has satisfied these performance characteristics.

As mentioned above, there has been developed no technique for imparting good antistatic performance to the molded article of the plastic resin while maintaining the original properties of the plastic resin.

Herein, antistatic agents for exerting antistatic effects are classified into a type that prevents the conduction of static electricity by the electric conductivity of water adsorbed onto the surface of the article and a type that utilizes the electric conductivity of an ionic structure. As the former type of antistatic agents, nonionic surfactants and amino resins are known. On the other hand, cations such as tertiary ammonium cations and metal cations and anions such as sulfonic acid group and phosphonic acid group are widely known as the latter type of antistatic agents.

Ionic compounds, notably organic salts, are also used as antistatic agents. Examples of organic cations are ammonium cation, sulfonium cation, phosphonium cation and carbo cation, whereas examples of organic anions are conjugate base of carboxylic acid, conjugate base of sulfonic acid, conjugate base of phosphoric acid, conjugate base of sulfoneimide, conjugate base of sulfonyl methane acid, borate anion and aluminate anion. In view of the antistatic performance, there are suitably used ionic compounds each consisting of a metal cation and a carbon-containing organic anion. For instance, a lithium salt of tris(trifluoromethanesulfonyl)methide is reported as an ionic compound in which the anion is an organic anion containing a fluoroalkyl group to show good antistatic performance. (See Patent Document 1.)

A copolymer of an olefinic methide monomer $CF_2=CFOCF_2CF(CF_3)OCF_2SO_2C(Li)(SO_2CF_3)_2$ and vinylidene fluoride is disclosed in Patent Document 2. This copolymer is however nearly a perfluoro compound and limited for specific uses because of its solvent solubility, substrate surface adhesion and film forming property.

PRIOR ART DOCUMENTS

Patent Documents

Patent Document 1: Japanese Laid-Open Patent Publication No. 2007-9042
Patent Document 2: Japanese Translation of PCT International Application Publication No. 2002-505356

Disclosure of the Invention

It is an object of the present invention to provide a fluorine-containing polymer by which the excellent antistatic performance of a methide structure can be imparted to an article over a long time and to provide an antistatic agent using the fluorine-containing polymer.

The present inventors have found that: it is possible to obtain a fluorine-containing polymer capable of forming a thin film that can exert an antistatic effect stably over a long time by the use of a homopolymer or copolymer having a side chain with a methide structure of good antistatic performance; and it is possible to easily form a firm, stable film from a composition of a solution of such a fluorine-containing polymer. The present invention has been accomplished based on the above findings.

Namely, the present invention includes Inventive Features 1 to 10 as follows.

[Inventive Feature 1]

A fluorine-containing polymer comprising a repeating unit of the general formula (2) and produced by homopolymerization or copolymerization with an other polymerizable double bond-containing monomer.

[Chem. 1]

$$\underset{\phantom{Q}}{+}Q-W-\underset{SO_2R^1}{\overset{SO_2R^1}{C^-}} \quad M^+ \qquad (2)$$

In the general formula (2), W represents a linking group; $R^1$ each independently represents a perfluoroalkyl group; Q represents a unit structure formed by cleavage of a double bond of a polymerizable double bond-containing group; and $M^+$ represents a hydrogen cation, a metal ion or a quaternary ammonium ion of the general formula (15)

[Chem. 2]

$$R^{11}-\underset{R^{12}}{\overset{R^{14}}{N^+}}-R^{13} \qquad (15)$$

where $R^{11}$ to $R^{14}$ each independently represent a substituted or unsubstituted $C_1$-$C_{20}$ alkyl or aryl group.

[Inventive Feature 2]

The fluorine-containing polymer according to Inventive Feature 1, wherein Q represents a unit structure of the general formula (6).

[Chem. 3]

$$-(\underset{R^6}{\overset{R^5}{C}}-\underset{}{\overset{R^7}{C}})- \qquad (6)$$

In the general formula (6), $R^5$, $R^6$ and $R^7$ each independently represent a hydrogen atom, a halogen atom, a $C_1$-$C_4$ linear, branched or cyclic alkyl group or a cyano group; any of $R^5$, $R^6$ and $R^7$ may be bonded together to form an alicyclic ring structure; and all or part of hydrogen atoms of the alkyl group or alicyclic ring structure may be substituted with a fluorine atom or a hydroxyl group.

[Inventive Feature 3]

The fluorine-containing polymer according to Inventive Feature 1 or 2, wherein W represents a divalent group of the general formula (3).

[Chem. 4]

$$\ce{\phantom{}}\underset{}{\overset{R'}{\diagup A\diagdown O\diagdown}_n} \qquad (3)$$

In the general formula (3), n represents an integer of 1 to 3; R' represents a hydrogen atom, a substituted or unsubstituted $C_1$-$C_3$ linear or branched alkyl group or a $C_3$-$C_{10}$ cyclic alkyl group; A is represented by $B^1$-$B^2$-$B^3$; $B^1$ represents a single bond or any one selected from the following groups:

[Chem. 5]

$$\underset{}{\overset{O}{\underset{\|}{C}}}, \quad \underset{}{\overset{O}{\underset{\|}{C}}}\diagdown O\diagup, \quad \underset{}{\overset{O}{\underset{\|}{C}}}\diagdown\underset{H}{N}\diagup, \quad -O-$$

$B^2$ represents a single bond, a linear, branched or cyclic alkylene group or a group in which a linear or branched alkylene group and a cyclic alkylene group are bonded in series; the linear, branched or cyclic alkylene group or the group in which the linear or branched alkylene group and the cyclic alkylene group are bonded in series may have a carbonyloxy group or amide bond inserted therein; all or part of hydrogen atoms of the linear, branched or cyclic alkylene group may be substituted with a fluorine atom; and $B^3$ represents a single bond or any one selected from the following groups:

[Chem. 6]

$$\underset{}{\overset{O}{\underset{\|}{C}}}, \quad \diagdown O \diagdown \underset{}{\overset{O}{\underset{\|}{C}}} \diagdown, \quad \diagdown\underset{H}{N} \diagdown \underset{}{\overset{O}{\underset{\|}{C}}} \diagdown.$$

[Inventive Feature 4]

The fluorine-containing polymer according to any one of Inventive Features 1 to 3, wherein Q represents a unit structure formed by cleavage of a polymerizable double bond of any one polymerizable double bond-containing group selected from the following groups:

[Chem. 7]

$$\text{structures with } CH_3, CF_3$$

[Inventive Feature 5]

A fluorine-containing polymer produced by copolymerization of a fluorine-containing monomer of the general formula (1) with at least one monomer selected from the group consisting of acrylic esters, fluorine-containing acrylic esters, methacrylic esters, fluorine-containing methacrylic esters, styrenic compounds, fluorine-containing styrenic compounds, vinyl ethers, fluorine-containing vinyl ethers, allyl ethers, fluorine-containing allyl ethers, acrylamides, methacrylamides, vinyl esters, allyl esters, olefins, fluorine-containing olefins, norbornene compounds, fluorine-containing norbornene compounds, sulfur dioxide and vinyl silanes.

[Chem. 8]

$$Q'-W-\underset{SO_2R^1}{\overset{SO_2R^1}{C^-}} \quad M^+ \qquad (1)$$

In the general formula (1), W and $R^1$ are the same as defined in the general formula (2); Q' represents a polymerizable double bond-containing group that forms a unit structure Q by cleavage thereof.

[Inventive Feature 6]

An antistatic agent comprising at least the fluorine-containing polymer according to any one of Inventive Features 1 to 5 and a solvent.

[Inventive Feature 7]

An antistatic agent, comprising: the fluorine-containing polymer according to Inventive Feature 1 in which $M^+$ of the general formula (2) is a hydrogen cation; and a quaternary ammonium ion of the general formula (15).

[Chem. 15]

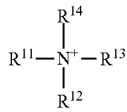

(15)

In the general formula (15), $R^{11}$ to $R^{14}$ each independently represent a substituted or unsubstituted $C_1$-$C_{20}$ alkyl group or aryl group.

[Inventive Feature 8]

The antistatic agent according to Inventive Feature 7, wherein the quaternary ammonium ion is a cation derived from a quaternary ammonium hydroxide.

[Inventive Feature 9]

An article having a surface to which the antistatic agent according to any one of Inventive Features 6 to 8 is applied to exert an antistatic effect.

[Inventive Feature 10]

A fluorine-containing polymer comprising a repeating unit of the following general formula:

[Chem. 10]

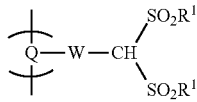

where W represents a linking group; $R^1$ each independently represents a perfluoroalkyl group; and Q represents a unit structure formed by cleavage of a double bond of a polymerizable double bond-containing group.

The fluorine-containing polymer of the present invention is characterized in that two perfluoroalkanesulfonyl groups are bonded to the same carbon at the end of the side chain of the repeating unit of the general formula (2). In other words, the direct bonding of two perfluoroalkanesulfonyl groups to carbon, which forms an acid with hydrogen, makes it possible to provide significant increase in the strength of the acid. The fluorine-containing polymer of the present invention is also characterized in that the polymerizable double bond-containing group and the strongly acidic methide moiety are adequately separated from each other by the linking group W. This makes it possible to secure the stability of the fluorine-containing monomer that serves as a precursor for formation of the fluorine-containing polymer and thereby possible to maintain the stability of the fluorine-containing polymer.

DETAILED DESCRIPTION

The present invention provides a film-formable solution-type antistatic agent.

The antistatic agent of the present invention includes: a fluorine-containing polymer having a repeating unit of the general formula (2) and produced by homopolymerization of a fluorine-containing monomer of the general formula (1) or copolymerization of a fluorine-containing monomer of the general formula (1) with any monomer other than the fluorine-containing monomer of the general formula (1); and a solvent.

[Chem. 11]

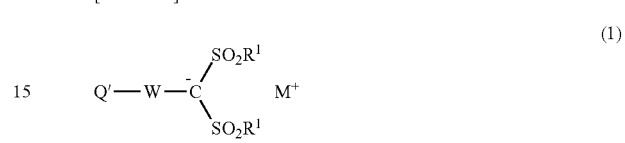

(1)

In the general formula (1), W represents a linking group; $R^1$ each independently represents a perfluoroalkyl group; Q' represents a polymerizable double bond-containing group that forms a unit structure Q by cleavage of a double bond thereof; $M^+$ represents a hydrogen cation, a metal ion or a quaternary ammonium cation of the general formula (15)

[Chem. 12]

(15)

where $R^{11}$ to $R^{14}$ each independently represent a substituted or unsubstituted $C_1$-$C_{20}$ alkyl or aryl group.

[Chem. 13]

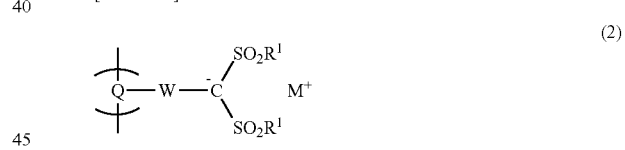

(2)

In the general formula (2), W represents a linking group; $R^1$ each independently represents a perfluoroalkyl group; and Q represents a unit structure formed by cleavage of a double bond of the polymerizable double bond-containing group Q'.

The antistatic agent of the present invention may further include any other component.

In the antistatic agent of the present invention, the fluorine-containing polymer can be that in which $M^+$ of the general formula (2) is $H^+$ as mentioned above. However, the addition of either the quaternary ammonium salt or metal salt enables improvement in the antistatic effect of the fluorine-containing polymer. As the acidity of the fluorine-containing polymer having the repeating unit of the general formula (2) becomes significantly increased with the addition of the anion, it is assumed that the cation does not form a fixed bond but forms a weak bond with the anion at a surface of the polymer compound. The antistatic effect of the present invention is thus different from the ordinary antistatic effect that results from the ionic conductivity of water adsorbed on the substrate surface.

The fluorine-containing monomer of the general formula (1) has a structure in which the polymerizable double bond-containing group is linked to the methide moiety by the linking group W.

In the general formula (1), the linking group W is preferably represented by the general formula (3)

[Chem. 14]

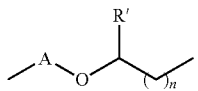

(3)

where n represents an integer of 1 to 3; R' represents a hydrogen atom, a substituted or unsubstituted $C_1$-$C_3$ linear or branched alkyl group or a $C_3$-$C_{10}$ cyclic alkyl group.

Herein, A is represented by $B^1$-$B^2$-$B^3$. In this formula, $B^1$ represents a single bond or any one selected from the following groups.

[Chem. 15]

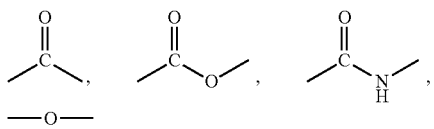

$B^2$ represents a single bond, a linear, branched or cyclic alkylene group or a group in which a linear or branched alkylene group and a cyclic alkylene group are bonded in series. The linear, branched or cyclic alkylene group or the group in which the linear or branched alkylene group and the cyclic alkylene group are bonded in series may have a carbonyloxy group or amide bond inserted therein. All or part of hydrogen atoms of the linear, branched or cyclic alkylene group may be substituted with a fluorine atom.

Further, $B^3$ represents a single bond or any one selected from the following groups.

[Chem. 16]

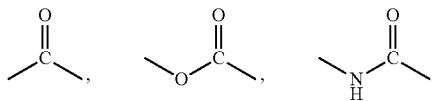

Examples of the alkyl group represented by R' are methyl, ethyl, n-propyl, isopropyl, trifluoromethyl, 2,2,2-trifluoroethyl, hexafluoroisopropyl, cyclopentyl, cyclohexyl, cycloheptyl, norbornyl and adamantyl. Among others, R' is preferably a hydrogen atom, a methyl group, an ethyl group or an isopropyl group in view of the ease of production.

Namely, $B^2$ can be represented by the general formula (5)

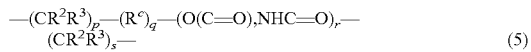

(5)

where p and s each independently represent an integer of 0 to 10; q and r each independently represent 0 or 1; $R^2$ and $R^3$ each independently represent a monovalent atom or group; $R^2$ and $R^3$ bonded to the same carbon may form a ring structure, preferably an alicyclic hydrocarbon group; and $R^c$ represents a divalent alicyclic hydrocarbon group or an aromatic hydrocarbon group.

There is no particular restriction on the monovalent atom or group $R^2$, $R^3$. The monovalent atom or group $R^2$, $R^3$ can be a halogen atom (the term "halogen atom" refers to fluorine, chlorine, bromine or iodine throughout the present specification), a hydroxyl group, or a monovalent organic group having a carbon number of 1 to 30 (3 to 30 when the organic group is cyclic) and selected from an alkyl group, a substituted alkyl group, an alicyclic hydrocarbon group, an aryl group, a condensed polycyclic aromatic group and a hetero ring group. All or part of hydrogen atoms of the monovalent organic group may be substituted with a fluorine atom. Further, all or part of carbon atoms of the monovalent organic group may be replaced by an oxygen atom, a sulfur atom and/or a nitrogen atom. Preferred as the halogen atom is a fluorine atom.

Examples of the alkyl group are those having a carbon number of 1 to 30, preferably 1 to 12, such as methyl, ethyl, n-propyl, i-propyl, n-butyl, 1-methylpropyl, 2-methylpropyl, tert-butyl, n-pentyl, i-pentyl, 1,1-dimethylpropyl, 1-methylbutyl, 1,1-dimethylbutyl, n-hexyl, n-heptyl, i-hexyl, n-octyl, i-octyl, 2-ethylhexyl, n-nonyl, n-decyl, n-undecyl and n-dodecyl. Particularly preferred are methyl, ethyl, n-propyl and i-propyl.

As the substituted alkyl group, there can be preferably used those in which the above alkyl groups are each substituted with an alkoxy group having a carbon number of 1 to 4, a halogen atom, an acyl group, an acyloxy group, a cyano group, a hydroxyl group, a carboxyl group, an alkoxycarbonyl group or a nitro group. Preferably, the substituent of the substituted alkyl group is a fluorine atom. Specific examples of the substituted alkyl group are trifluoromethyl, pentafluoroethyl, 2,2,2-trifluoroethyl, n-heptafluoropropyl, 2,2,3,3,3-pentafluoropropyl, 3,3,3-trifluoropropyl and hexafluoroisopropyl.

Examples of the alkoxy group are those having a carbon number of 1 to 4, such as methoxy, ethoxy, propoxy and butoxy.

The divalent alicyclic hydrocarbon group represented by $R^c$ and the monovalent or divalent acyclic hydrocarbon group represented by $R^2$, $R^3$ of the linking group W can be monocyclic or polycyclic. Specific examples of the alicyclic hydrocarbon groups are organic groups each obtained by removing one or two hydrogen atoms from a monocyclo, bicyclo, tricyclo or tetracyclo structure of three or more carbon atoms. The carbon number of the alicyclic hydrocarbon group is preferably of 3 to 30. Further, these alicyclic hydrocarbon groups may each have a substituent.

The monocyclic group preferably has 3 to 12 ring carbons, more preferably 3 to 7 ring carbons. Preferred examples of the monocyclic group are organic groups each obtained by removing one or two hydrogen atoms bonded to ring carbons of cyclopropylene, cyclobutane, cyclopentane, cyclohexane, cycloheptane, cyclooctane, cyclodecane, cyclododecane, tricyclodecane or tert-butylcyclohexane. Preferred examples of the polycyclic group are organic groups each obtained by removing one or two hydrogen atoms bonded to ring carbons of a polycyclic compound having 7 to 15 ring carbons, such as adamantane, noradamantane, decalin, tricyclodecane, tetracyclodecane, norbornane or cedrol.

The alicyclic hydrocarbon group may be a spiro ring preferably having a carbon number of 3 to 6. One or two or more hydrogen atoms of each of these organic groups may be each independently substituted with $C_{1-25}$ alkyl, substituted $C_{1-25}$ alkyl, hydroxyl, alkoxy, carboxyl or alkoxycarbonyl, one or two or more hydrogen atoms of which may be substituted with fluorine or trifluoromethyl.

The alkyl group is preferably a methyl group, an ethyl group, a propyl group, an isopropyl group, a butyl group or the like (occasionally referred to as "lower alkyl group" throughout the present specification), more preferably any group selected from the group consisting of methyl, ethyl, propyl and isopropyl. Examples of the substituent of the substituted alkyl group are a hydroxyl group, a halogen atom and an alkoxy group. Examples of the alkoxy group are those having a carbon number of 1 to 4, such as methoxy, ethoxy, propoxy and butoxy. Examples of the alkoxycarbonyl group are methoxycarbonyl, ethoxycarbonyl, propoxycarbonyl and butoxycarbonyl.

Examples of the aryl group are those having a carbon number of 3 to 30. The aryl group, when monocyclic, preferably has 3 to 12 ring carbons, more preferably 3 to 6 ring carbons. Examples of the monocyclic aryl group are phenyl, biphenyl, terphenyl, o-tolyl, m-tolyl, p-tolyl, p-hydroxyphenyl, p-methoxyphenyl, mesityl, o-cumenyl, 2,3-xylyl, 2,4-xylyl, 2,5-xylyl, 2,6-xylyl, 3,4-xylyl, 3,5-xylyl, o-fluorophenyl, m-fluorophenyl, p-fluorophenyl, o-trifluoromethylphenyl, m-trifluoromethylphenyl, p-trifluoromethylphenyl, 2,3-bistrifluoromethyl, 2,4-bistrifluoromethyl, 2,5-bistrifluoromethyl, 2,6-bistrifluoromethyl, 3,4-bistrifluoromethyl, 3,5-bistrifluoromethyl, p-chlorophenyl, p-bromophenyl and p-iodophenyl.

Examples of the condensed polycyclic aromatic group are monovalent organic groups each containing a condensed polycyclic aromatic ring such as pentalene, indene, naphthalene, azulene, heptalene, biphenylene, indacene, acenaphthylene, fluorene, phenalene, phenanthrene, anthracene, fluorancene, acephenanthrylene, aceanthrylene, triphenylene, pyrene, chrysene, naphthacene, picene, perylene, pentaphene, pentacene, tetraphenylene, hexaphene, hexacene, rubicene, coronene, trinaphthylene, heptaphene, heptacene, pyranthrene and ovalene. One or two or more hydrogen atoms of each of these organic groups may preferably be substituted with a fluorine atom or a $C_1$-$C_4$ alkyl or fluorine-containing alkyl group.

Examples of the monocyclic or polycyclic hetero ring group having 3 to 30 ring atoms are pyridyl, furyl, thienyl, pyranyl, pyrrolyl, thianthrenyl, pyrazolyl, isothiazolyl, isoxazolyl, pyrazinyl, pyrimidinyl, pyridazinyl, tetrahydropyranyl, tetrahydrofuranyl, tetrahydrothiopyranyl, tetrahydrothiofuranyl and 3-tetrahydrothiophene-1,1-dioxide. There can also be used those in which one or two or more hydrogen atoms on the ring atoms of the above groups are each substituted with an alkyl group, an alicyclic hydrocarbon group, an aryl group or a hetero ring group.

Among the hetero ring groups, preferred are those having a monocyclic or polycyclic ether ring or a lactone ring as exemplified as follows.

[Chem. 17]

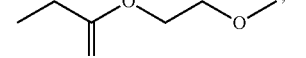

In the formula, $R^a$ and $R^b$ each independently represent a hydrogen atom or a $C_1$-$C_4$ alkyl group; and n represents an integer of 2 to 4.

As mentioned above, in the general formula (1) or (2), the linking group W is preferably represented by the general formula (3)

[Chem. 18]

(3)

where n represents an integer of 1 to 3; R' represents a hydrogen atom, a substituted or unsubstituted $C_1$-$C_3$ linear or branched alkyl group or a $C_3$-$C_{10}$ cyclic alkyl group. The followings are preferred examples of the moiety A of the linking group W.

[Chem. 19]

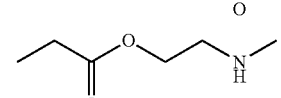

The unit structure Q of the fluorine-containing polymer, formed by cleavage of the polymerizable double bond-containing group, is preferably represented by the general formula (6).

[Chem. 20]

(6)

In the general formula (6), $R^5$, $R^6$ and $R^7$ each independently represent a hydrogen atom, a halogen atom, a $C_1$-$C_{10}$ linear or branched alkyl group, a $C_3$-$C_{20}$ alicyclic hydrocarbon group or a cyano group. Any of $R^5$, $R^6$ and $R^7$ may be bonded together to form an alicyclic ring structure. Any of hydrogen atoms of the alkyl group, alicyclic ring structure or alicyclic hydrocarbon group may be substituted with a fluorine atom or a hydroxyl group.

The alkyl group can be either substituted or unsubstituted and refers to those having a carbon number of 1 to 4. Examples of the alkyl group are methyl, ethyl, n-propyl, isopropyl, n-butyl, isobutyl, sec-butyl and tert-butyl.

Examples of the substituent of the alkyl group are a $C_1$-$C_4$ alkoxy group, a halogen atom, an acyl group, an acyloxy group, a cyano group, a hydroxyl group, a carboxyl group, an alkoxycarbonyl group and a nitro group.

The alicyclic ring structure or alicyclic hydrocarbon group can be monocyclic or polycyclic. Examples of the alicyclic ring structure or alicyclic hydrocarbon group are those each having a monocyclo, bicyclo, tricyclo or tetracyclo structure of three or more carbon atoms. These may each have a substituent.

The monocyclic group preferably has 3 to 12 ring carbons, more preferably 3 to 7 ring carbons. Preferred examples of the monocyclic group are organic groups each obtained by removing one or more hydrogen atoms bonded to ring carbons of cyclopropylene, cyclobutane, cyclopentane, cyclohexane, cycloheptane, cyclooctane, cyclodecane, cyclododecane, tricyclodecane or tert-butylcyclohexane. Preferred examples of the polycyclic group are organic groups each obtained by removing one or more hydrogen atoms bonded to ring carbons of a polycyclic compound having 7 to 15 ring carbons, such as adamantane, noradamantane, decalin, tricyclodecane, tetracyclodecane, norbornane or cedrol.

The alkyl group is preferably a lower alkyl group such as methyl, ethyl, propyl, isopropyl or butyl, more preferably any group selected from the group consisting of methyl, ethyl, propyl and isopropyl. Examples of the substituent of the substituted alkyl group are a hydroxyl group, a halogen atom and an alkoxy group. Examples of the alkoxy group are those having a carbon number of 1 to 4, such as methoxy, ethoxy, propoxy and butoxy. Examples of the alkoxycarbonyl group are methoxycarbonyl, ethoxycarbonyl, propoxycarbonyl and butoxycarbonyl.

The following are organic groups usable as the polymerizable double bond-containing group Q' of the fluorine-containing monomer of the general formula (1).

There can be used $C_2$-$C_{10}$ alkenyl groups such as vinyl, allyl, 1-propenyl, 1-butenyl, 1-pentenyl, 1-methyl-1-propenyl, 1-methyl-1-butenyl, 2-methyl-1-butenyl, 1-methyl-1-pentenyl, 2-methyl-1-pentenyl, 3-methyl-1-pentenyl and 4-methyl-1-pentenyl.

There can be used $C_2$-$C_{10}$ fluorine-containing alkenyl groups such as perfluoroallyl, 3-trifluoromethyl-2-propenyl, 3-trifluoromethyl-2-propenyl, 1-perfluorobutenyl, 1-perfluoropentenyl, 1-trifluoromethyl-1-butenyl, 2-trifluoromethyl-1-butenyl, 3-trifluoromethyl-1-butenyl and 4-trifluoromethyl-1-butenyl.

There can be used $C_2$-$C_{10}$ alkenyl groups each substituted with a substituted or unsubstituted phenyl group, such as 1-phenyl-1-propenyl, 2-phenyl-1-propenyl, 3-phenyl-1-propenyl, 1-phenyl-1-butenyl, 3-phenyl-1-butenyl and 4-phenyl-1-butenyl.

There can also be used $C_2$-$C_3$ alkenyl groups each substituted with an alicyclic hydrocarbon group, a cycloether group, a lactone group or an alkenyl group having an alicyclic hydrocarbon structure e.g. norbornene skeleton, norbornane skeleton, isobornyl skeleton, tricyclodecane skeleton, tetracyclodecane skeleton or adamantane skeleton.

The alicyclic hydrocarbon group used as $R^5$, $R^6$, $R^7$ or formed by $R^5$, $R^6$, $R^7$ together with carbon atoms bonded thereto can be monocyclic or polycyclic. Examples of the alicyclic hydrocarbon group are those each having a monocyclo, bicyclo, tricyclo or tetracyclo structure of five or more carbon atoms. The carbon number of the alicyclic hydrocarbon group is preferably 6 to 30, more preferably 7 to 25. Further, the alicyclic hydrocarbon group may have a substituent.

The unit structure Q of the fluorine-containing polymer, formed by cleavage of the polymerizable double bond-containing group, may be a ring structure in which $R^5$ and $R^6$ or $R^7$ are combined together as follows.

[Chem. 21]

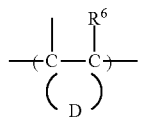

(7)

In the general formula (7), $R^6$ represents a hydrogen atom, a cyano group, a halogen atom or an alkyl group.

Further, D represents an atomic group containing two carbon atoms C—C bonded to each other to form an alicyclic ring structure. Examples of the alicyclic ring structure are $C_3$-$C_{10}$ monocyclic or polycyclic structures such as cyclopentane, cyclohexane, cycloheptane and norbornane, in each of which at least one hydrogen atom may be substituted with a lower alkyl group or a lower fluoroalkyl group.

The unit structure Q of the fluorine-containing polymer, formed by cleavage of the polymerizable double bond-containing group, may alternatively be those represented by the following general formulas (8-1) and (8-2) or those derived from a vinylphenyl group.

[Chem. 22]

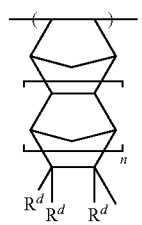

(8-1)

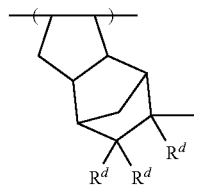

(8-2)

In the general formulas (8-1) and (8-2), $R^d$ each independently represent a hydrogen atom, a halogen atom or a cyano group; and n represents an integer of 1 to 4.

As mentioned above, preferred examples of the polymerizable double bond-containing group Q', which forms the unit structure Q by cleavage thereof, are: (p1) $CH_2$=CH—; (p2) $CH_2$=C($CH_3$)—; (p3) $CH_2$=C($CF_3$)—; (p4) $CH_2$=C ($CH_2OH$)—; and (p5) those capable of providing repeating units of the following formulas (9-1) to (9-5) after double bond cleavage.

[Chem. 23]

(9-1)
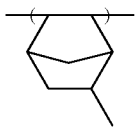

(9-2)
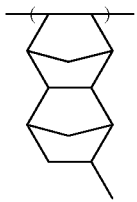

(9-3)
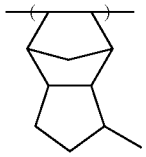

(9-4)

(9-5)
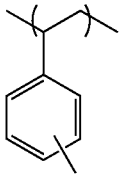

Among others, (p1), (p2) or (p3) is particularly preferred. More particularly preferred is (p2). Some preferred examples of the polymerizable double bond-containing group Q' are indicated as follows. The polymerizable double bond-containing group Q' is not however limited to these examples.

[Chem. 24]

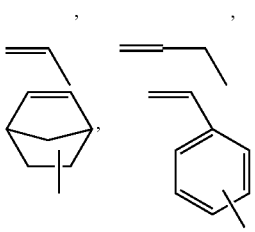

When the fluorine-containing monomer of the general formula (1) having the above polymerizable double bond-containing group Q' is subjected to homopolymerization or copolymerization with the other polymerizable double bond-containing monomer, the fluorine-containing polymer of the general formula (2) having the unit structure Q is produced upon cleavage of the polymerizable double bond.

The following are preferred examples of the fluorine-containing monomer of the general formula (1), which serves as the precursor for the fluorine-containing polymer of the general formula (2). It should be noted that these examples are not intended to limit the present invention thereto.

[Chem. 25]

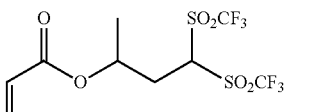

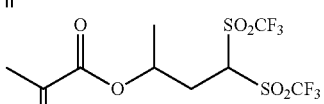

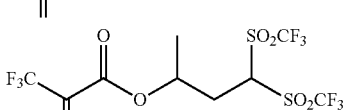

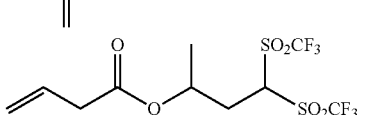

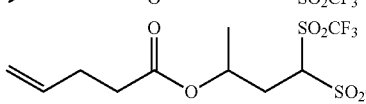

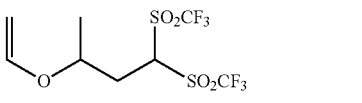

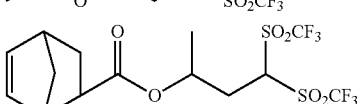

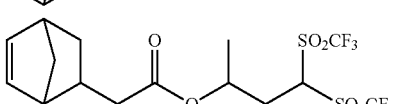

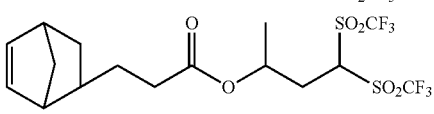

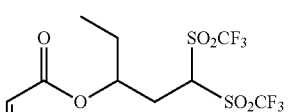

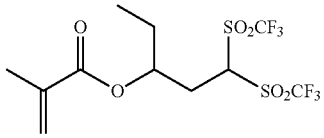

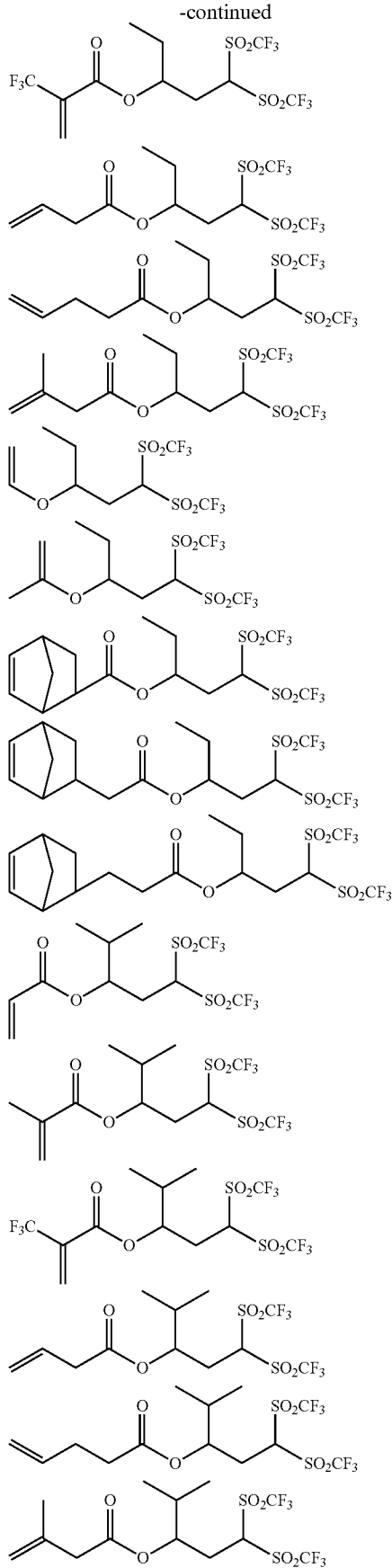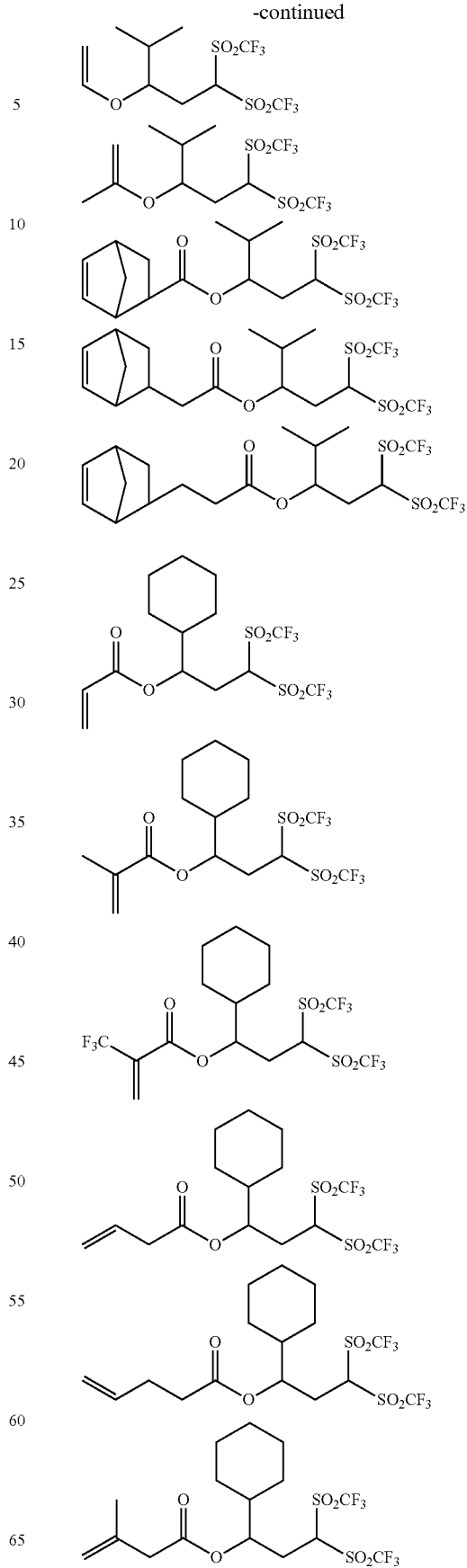
[Chem. 26]

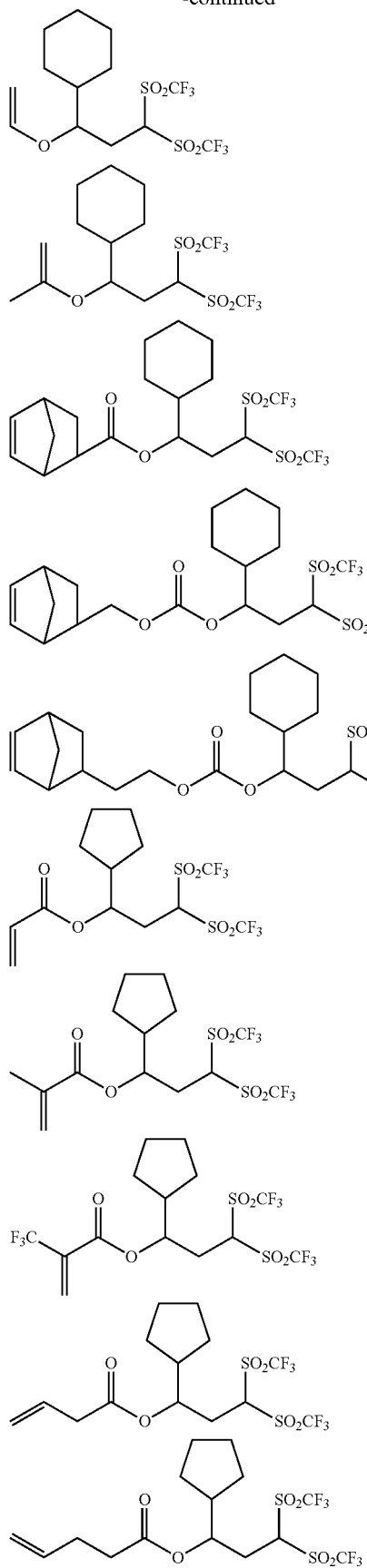

-continued
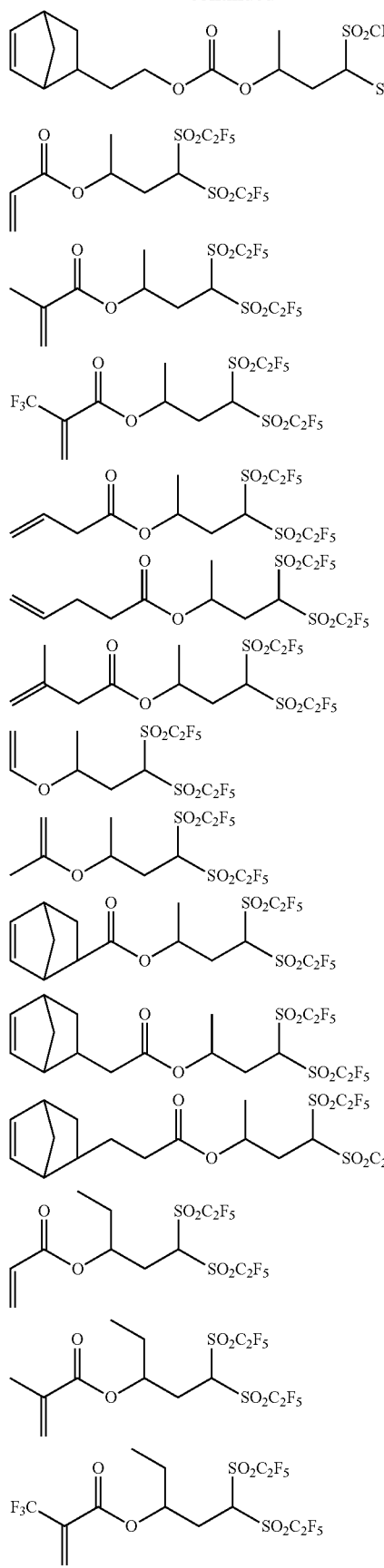
[Chem. 28]
-continued
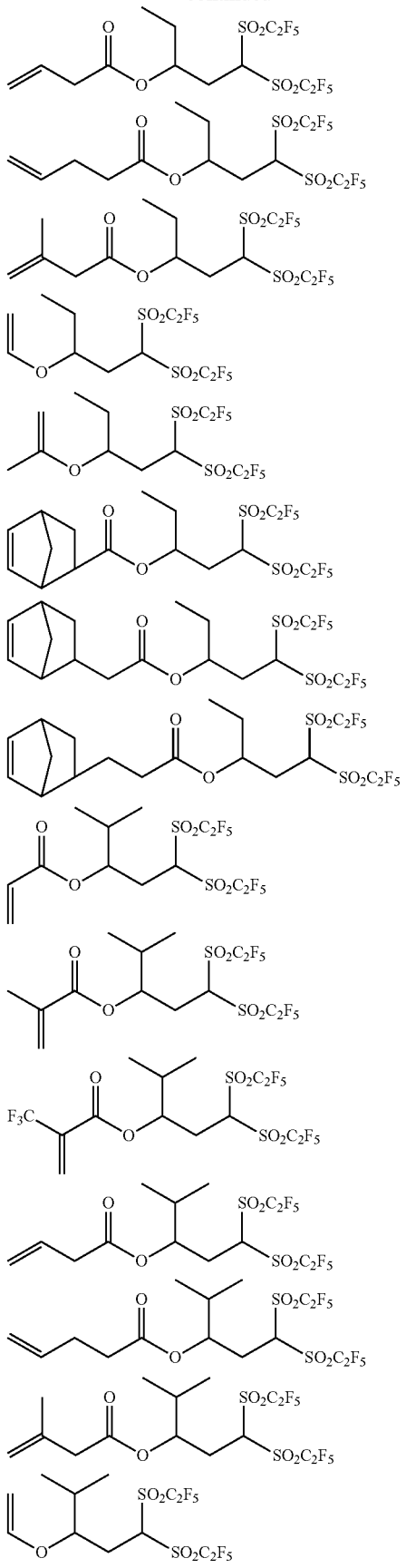

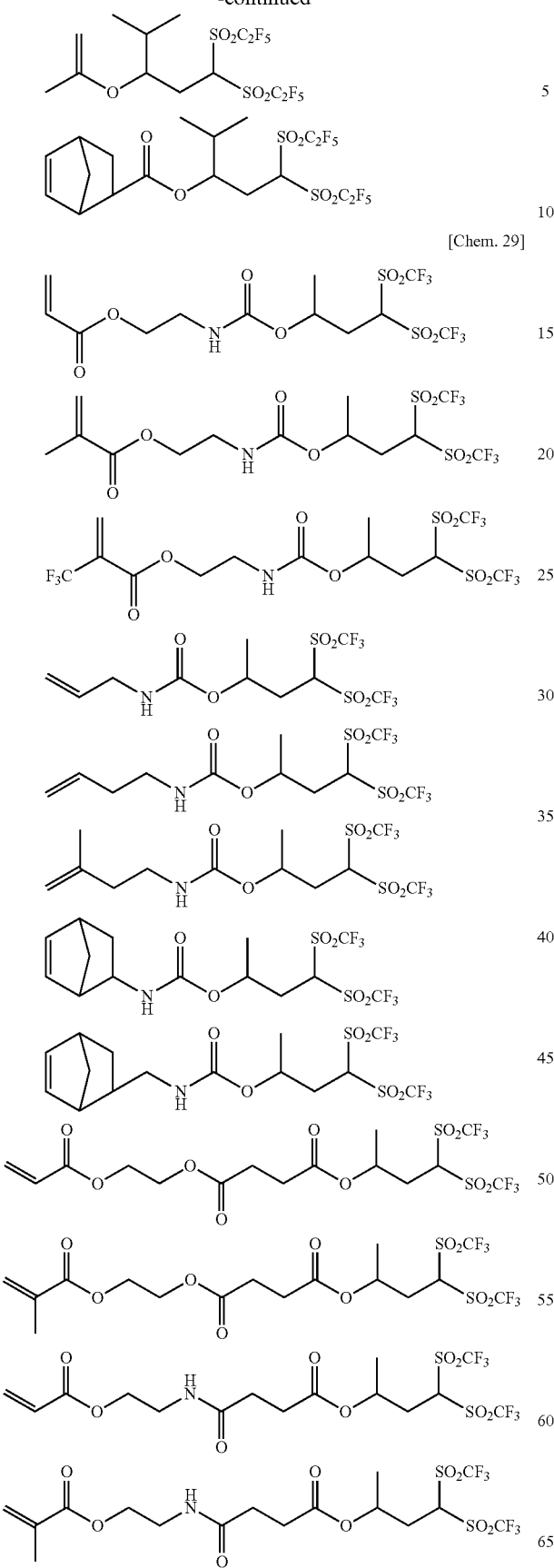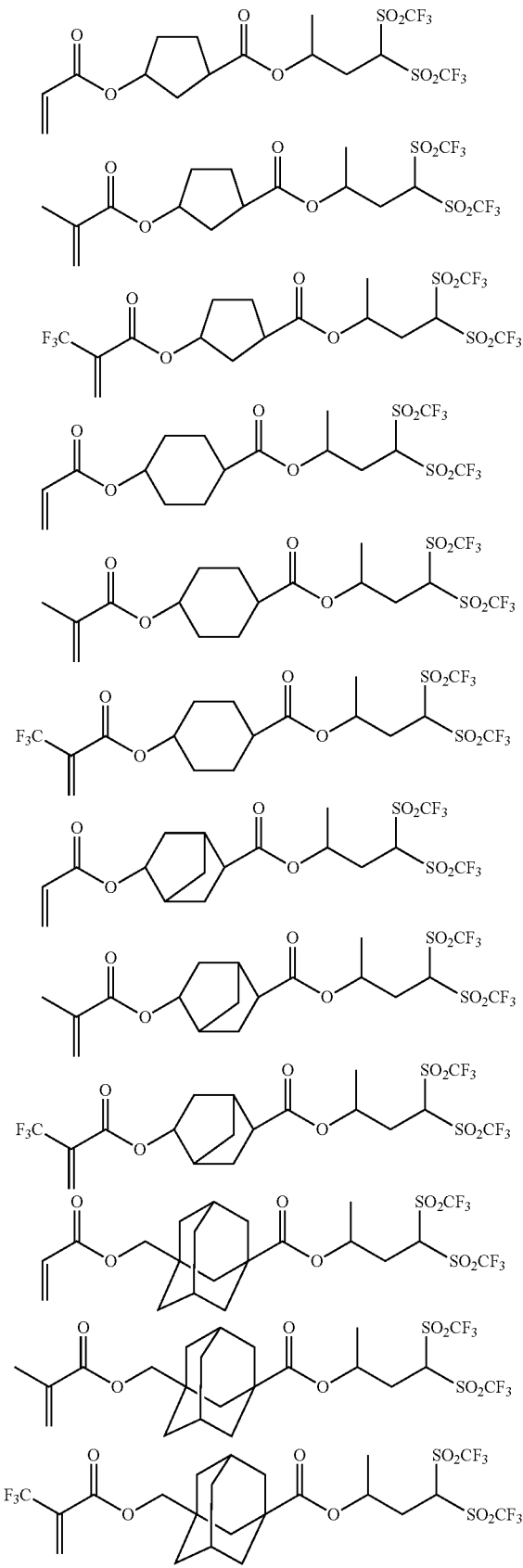

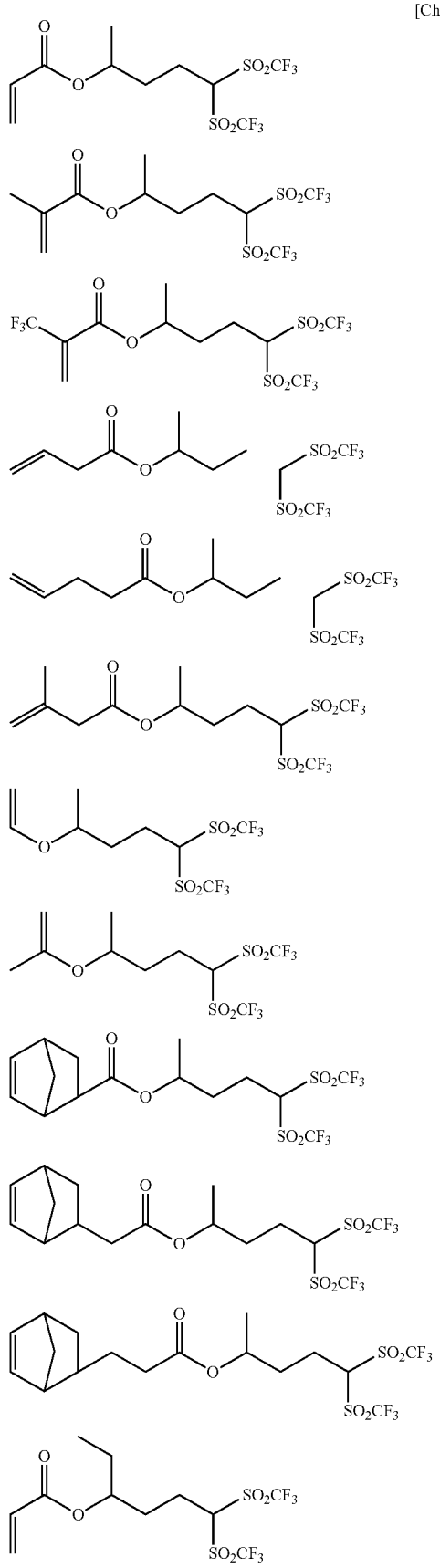
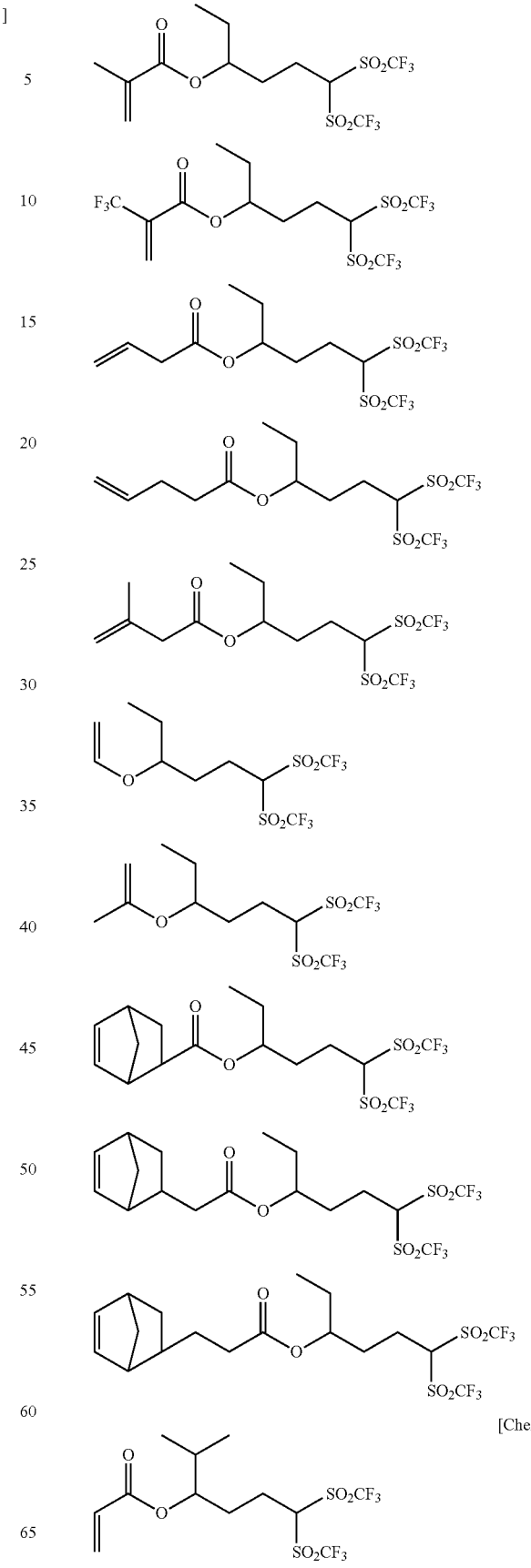

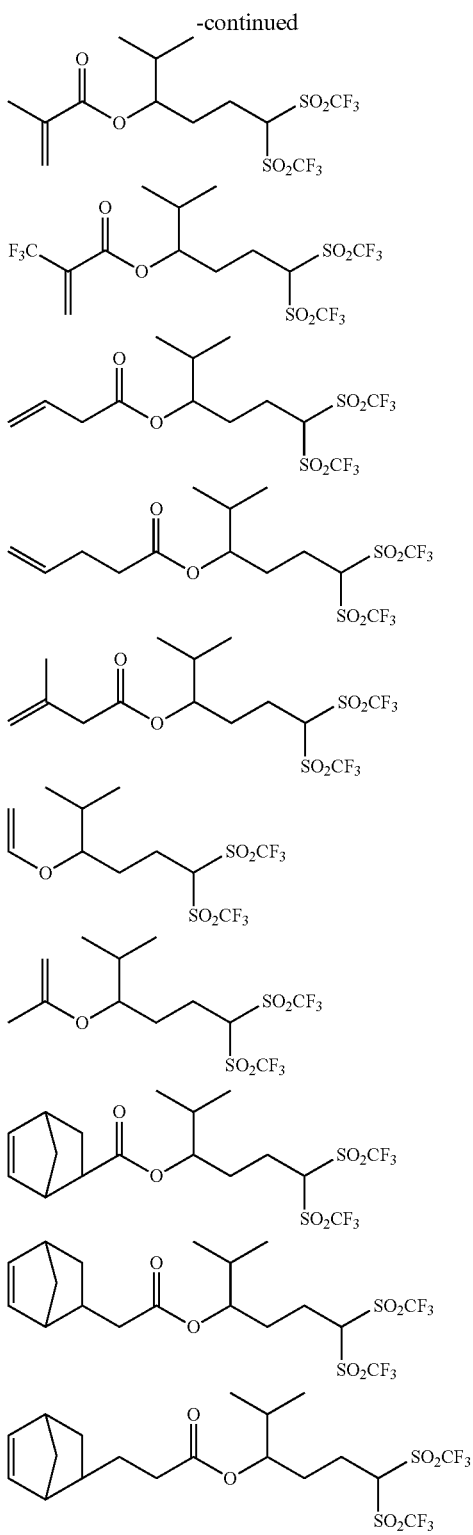

[Fluorine-Containing Polymer]

The fluorine-containing polymer of the present invention has a repeating unit of the general formula (2) produced by homopolymerization of the fluorine-containing monomer of the general formula (1) or copolymerization of the fluorine-containing monomer of the general formula (1) with the other polymerizable double bond-containing monomer.

[Chem. 33]

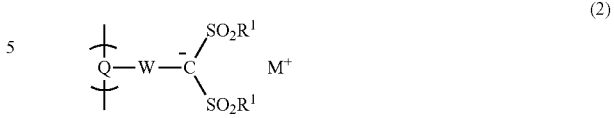

(2)

In the general formula (2), W represents a linking group; $R^1$ each independently represents a perfluoroalkyl group; Q represents a unit structure formed by cleavage of a double bond of a polymerizable double bond-containing group; and $M^+$ represents a hydrogen cation, a metal ion or a quaternary ammonium cation of the general formula (15)

[Chem. 34]

(15)

where $R^{11}$ to $R^{14}$ each independently represent a substituted or unsubstituted $C_1$-$C_{20}$ alkyl or aryl group.

The repeating unit of the fluorine-containing polymer is formed by cleavage of the polymerizable double bond of the fluorine-containing monomer of the general formula (1) into a divalent group. Thus, the same explanations of the polymerizable double bond from which the chain skeleton is derived, the group containing such a polymerizable double bond group, the organic groups and the linking group of the fluorine-containing monomer of the general formula (1) can apply as they are to the fluorine-containing polymer.

[Production Method of Fluorine-Containing Monomer]

It is convenient to use an alcohol of the general formula (10) for production of the fluorine-containing monomer of the general formula (1) of the present invention.

[Chem. 35]

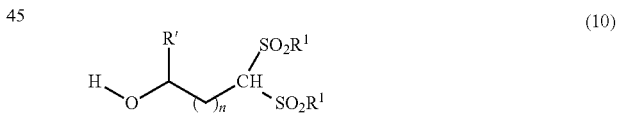

(10)

In the general formula (10), $R^1$ is the same as defined in the general formula (2); and R' and n are the same as defined in the general formula (3).

The above fluorine-containing alcohol can be obtained by a process described in "Journal of Organic Chemistry, 1973, Vol. 38, 19, P. 3358-3363 (U.S.)" or the like. For instance, 3-hydroxy-1,1-bis(trifluoromethanesulfonyl)butyric acid of the after-mentioned formula (11) can be prepared by treating 1,1-bis(trifluoromethanesulfonyl)-3-butene with sulfuric acid. A process for preparation of 1,1-bis(trifluoromethanesulfonyl)-3-butene is also described in the above reference document.

There is no particular restriction on the method for production of the fluorine-containing monomer of the general formula (1) in the present invention. For example, the fluorine-containing monomer of the general formula (1) can be obtained as a product of esterification reaction of the alcohol of the general formula (10) with a carboxylic halide of the general formula (11) or a carboxylic anhydride of the general formula (12).

[Chem. 36]

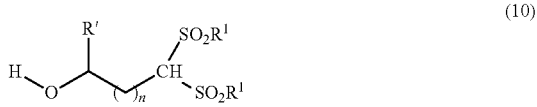
(10)

In the general formula (10), $R^1$ is the same as defined in the general formula (2); and R' and n are the same as defined in the general formula (3).

$$Q'\text{-}A\text{-}COX \quad (11)$$

In the general formula (11), Q' and A are the same as defined in the general formula (1) or (3); and X represents fluorine, chlorine, bromine or iodine.

$$(Q'\text{-}A\text{-}CO)_2O \quad (12)$$

In the general formula (12), Q' and A are the same as defined in the general formula (1) or (3).

The fluorine-containing monomer can be obtained as an urethane bond-containing product of reaction of the above alcohol with an isocyanate compound of the general formula (13).

$$Q'\text{-}A\text{-}NCO \quad (13)$$

In the general formula (13), Q' and A are the same as defined in the general formula (1) or (3).

Further, the fluorine-containing monomer can be obtained as an ether bond-containing product of reaction of the above alcohol with an olefin of the general formula (14).

$$Q'\text{-}A\text{-}CH=CH_2 \quad (14)$$

In the general formula (14), Q' and A are the same as defined in the general formula (1) or (3).

[Other Monomer]

In the present invention, the fluorine-containing monomer can be used, as the intermediate raw material of the antistatic agent, solely or for copolymerization with any other monomer. The "other monomer" will be next explained below.

The other monomer is not particularly restricted as long as it has a polymerizable carbon-carbon double bond. More specifically, at least one kind selected from acrylic esters, fluorine-containing acrylic esters, methacrylic esters, fluorine-containing methacrylic esters, styrenic compounds, fluorine-containing styrenic compounds, vinyl ethers, fluorine-containing vinyl ethers, allyl ethers, fluorine-containing allyl ethers, acrylamides, methacrylamides, vinyl esters, allyl esters, olefins, fluorine-containing olefins, norbornene compounds, fluorine-containing norbornene compounds, sulfur dioxide and vinyl silanes can be used as the other monomer in the copolymerization.

There is no particular restriction on the ester moiety of the acrylic ester or methacrylic ester. Examples of the acrylic esters or methacrylic esters are known acrylic or methacrylic ester compounds including: alkyl esters of acrylic acid or methacrylic acid, such as methyl acrylate or methacrylate, ethyl acrylate or methacrylate, n-propyl acrylate or methacrylate, isopropyl acrylate or methacrylate, n-butyl acrylate or methacrylate, isobutyl acrylate or methacrylate, tert-butyl acrylate or methacrylate, amyl acrylate or methacrylate, n-hexyl acrylate or methacrylate, n-octyl acrylate or methacrylate, hexyl acrylate or methacrylate, 2-ethylhexyl acrylate or methacrylate, benzyl acrylate or methacrylate, chlorbenzyl acrylate or methacrylate, octyl acrylate or methacrylate, furfuryl acrylate or methacrylate, tetrahydrofurfuryl acrylate or methacrylate, lauryl acrylate or methacrylate, 2-hydroxyethyl acrylate or methacrylate and 2-hydroxypropyl acrylate or methacrylate; adamantyl acrylate or methacrylate; alkyladamantyl acrylate or methacrylate; cyclohexyl acrylate or methacrylate; tricyclodecanyl acrylate or methacrylate; and acrylate or methacrylate having a ring structure such as norbornene ring. There can also be used those in which a trifluoromethyl group or cyano group is bonded to the α-position of the above acrylic or methacrylic ester compound.

The fluorine-containing acrylic ester or the fluorine-containing methacrylic ester used in the present invention is an acrylic ester or methacrylic ester in which the ester moiety contains fluorine. A cyano group may be introduced to the α-position of the acrylic or methacrylic ester.

As the monomer with the fluorine-containing ester moiety, there can be used, without particular limitation, those in which the ester moiety of the above acrylic ester or methacrylic ester is partially fluorinated, or equivalently, contains a fluorine-containing alkyl group or any of a fluorine-containing benzene ring, a fluorine-containing cyclopentane ring, a fluorine-containing cyclohexane ring, a fluorine-containing cycloheptane ring, a fluorine-containing norbornel group, a fluorine-containing norbornel group and a fluorine-containing adamantyl group each having a ring carbon substituted with a fluorine atom or a fluorine-containing alkyl group e.g. trifluoromethyl. There can also be used an acrylic ester or methacrylic ester that has an ester moiety containing a fluorine-containing tert-butyl ester or a cyclohexyl group or norbornyl group substituted with a hexafluoroisopropanol group.

The vinyl ethers or allyl ethers can be those each having a $C_1$-$C_{30}$ alkyl group, fluoroalkyl group or alicyclic hydrocarbon group as a substituent. It is preferable that these ether compounds each also have a halogen atom (fluorine, chlorine, bromine), a hydroxyl group, an amino group, an aryl group, an alkyl group or an alicyclic hydrocarbon as a substituent.

Examples of the alkyl vinyl ether are methyl vinyl ether, ethyl vinyl ether, propyl vinyl ether, isopropyl vinyl ether, butyl vinyl ether, isobutyl vinyl ether, sec-butyl vinyl ether, tert-butyl vinyl ether, pentyl vinyl ether, hexyl vinyl ether, octyl vinyl ether, decyl vinyl ether, dodecyl vinyl ether, cyclopentyl vinyl ether, cyclohexyl vinyl ether, norbornyl vinyl ether and adamantyl vinyl ether.

Examples of the perfluoroalkyl vinyl ether are perfluoromethyl vinyl ether, perfluoroethyl vinyl ether, perfluoropropyl vinyl ether, perfluoroisopropyl vinyl ether, perfluorobutyl vinyl ether, perfluoroisobutyl vinyl ether, perfluoro-sec-butyl vinyl ether, perfluoro-tert-butyl vinyl ether, perfluoropentyl vinyl ether, perfluorohexyl vinyl ether, perfluorooctyl vinyl ether and perfluorododecyl vinyl ether.

Examples of the hydroxyl-containing vinyl ether are hydroxymethyl vinyl ether, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, diethylene glycol monovinyl ether, polyethylene glycol monovinyl ether and 1,4-cyclohexanedimethanol vinyl ether. There can also be used ethylhexyl vinyl ether, methoxyethyl vinyl ether, ethoxyethyl vinyl ether, chlorethyl vinyl ether, 1-methyl-2,2-dimethylpropyl vinyl ether, 2-ethylbutyl vinyl ether, diethylene glycol vinyl ether, dimethylaminoethyl vinyl ether, diethylaminoethyl vinyl ether, butylaminoethyl vinyl ether, benzyl vinyl ether and tetrahydrofurfuryl vinyl ether.

Examples of the allyl ether are methyl allyl ether, ethyl allyl ether, propyl allyl ether, butyl allyl ether, benzyl allyl ether and cyclohexyl allyl ether. Examples of the hydroxyl-containing vinyl ether are hydroxymethyl vinyl ether, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, diethylene glycol monovinyl ether, polyethylene glycol monovinyl ether and 1,4-cyclohexanedimethanol vinyl ether.

There can also be used: epoxy-containing vinyl ether or allyl ether; β-ketoester-containing vinyl ether or allyl ether such as allyl acetoacetate; and silicon-containing vinyl ether with a hydrolytic group such as trimethoxy vinyl ether.

Examples of the allyl esters are allyl acetate, allyl caproate, allyl caprylate, allyl laurylate, allyl palmitate, allyl stearate, allyl benzoate, allyl acetoacetate and allyl lactate.

Examples of the vinyl esters are vinyl butyrate, vinyl isobutyrate, vinyl trimethylacetate, vinyl diethylacetate, vinyl valeate, vinyl caproate, vinyl chloracetate, vinyl dichloracetate, vinyl methoxyacetate, vinyl butoxyacetate, vinyl acetoacetate, vinyl lactate, vinyl-β-phenylbutyrate and vinyl cyclohexylcarboxylate.

There can also be used: dialkyl itaconates such as dimethyl itaconate, diethyl itaconate and dibutyl itaconate; dialkyl esters or monoalkyl esters of fumaric acid, such as dibutyl fumarate; and alkyl esters of vinylacetic acid, such as ethyl vinylacetate.

Examples of the olefins or fluorine-containing olefins are ethylene, propylene, cyclopropylene and fluoroolefins such as vinyl fluoride, vinylidene fluoride, trifluoroethylene, chlorotrifluoroethylene, tetrafluoroethylene, hexafluoropropylene, hexafluoroisobutene and octafluorocyclopentene.

The styrenic compounds usable in the present invention are those in which a vinyl group is bonded to an aromatic ring. Examples of the styrenic compounds are styrene, m- or p-hydroxystyrene, m- or p-methoxystyrene, m- or p-ethoxystyrene, m- or p-propoxystyrene, m- or p-isopropoxystyrene, m- or p-butoxystyrene, m- or p-tert-butoxystyrene, m- or p-(1-ethoxyethoxy)styrene, m- or p-(1-ethoxypropoxy)styrene, m- or p-(1-isobutoxyethoxy)styrene, m- or p-(2-tetrahydropyranyloxy)styrene, m- or p-tert-butoxycarbonyloxystyrene, m- or p-acetoxystyrene, m- or p-propionyloxystyrene, m- or p-pivaloyloxystyrene, m- or p-benzoyloxystyrene, m- or p-mesyloxystyrene, m- or p-phenylsulfonyloxystyrene and m- or p-tosyloxystyrene. There can also be used those in which a halogen atom, an alkyl group or a fluorine-containing alkyl group is bonded to the α-position of the above styrenic compound.

In the case of introducing a hydroxystyrene compound structure into the fluorine-containing polymer of the present invention, it is conceivable to first copolymerize e.g. p-butoxycarbonyloxystyrene and converting a butoxycarbonyl moiety of the resulting polymer to a hydroxyl group.

Further, there can be used vinylnaphthalene derivatives or isopropenylnaphthalene derivatives such as 2-hydroxy-1-vinylnaphthalene, 3-hydroxy-1-vinylnaphthalene, 4-hydroxy-1-vinylnaphthalene, 5-hydroxy-1-vinylnaphthalene, 6-hydroxy-1-vinylnaphthalene, 7-hydroxy-1-vinylnaphthalene, 8-hydroxy-1-vinylnaphthalene, 2-hydroxy-1-isopropenylnaphthalene, 3-hydroxy-1-isopropenylnaphthalene, 4-hydroxy-1-isopropenylnaphthalene, 5-hydroxy-1-isopropenylnaphthalene, 6-hydroxy-1-isopropenylnaphthalene, 7-hydroxy-1-isopropenylnaphthalene, 8-hydroxy-1-isopropenylnaphthalene, 2-carboxy-1-vinylnaphthalene, 3-carboxy-1-vinylnaphthalene, 4-carboxy-1-vinylnaphthalene, 5-carboxy-1-vinylnaphthalene, 6-carboxy-1-vinylnaphthalene, 7-carboxy-1-vinylnaphthalene and 8-carboxy-1-vinylnaphthalene.

As the norbornene compounds, fluorine-containing norbornene compounds or analogues thereof, there can be used monocyclic or polycyclic structure-containing norbornene monomers. Among others, preferably used are norbornene compounds obtained by Diels-Alder addition of unsaturated compounds, such as fluorine-containing olefins, allyl alcohols, fluorine-containing allyl alcohols, acrylic acid, α-fluoroacrylic acid, methacrylic acid, vinyl esters, fluorine-containing vinyl esters, acrylic esters, methacrylic esters, fluorine-containing acrylic esters and fluorine-containing acrylic esters as mentioned in the present specification, with cyclopentadiene or cyclohexadiene.

Examples of the acrylamides or methacrylamides are unsaturated amide compounds including: acrylamide or methacrylamide; N-alkyl acrylamide or methacrylamide (where the alkyl group is that having a carbon number of 1 to 10, such as methyl, ethyl, propyl, butyl, tert-butyl, heptyl, octyl, cyclohexyl or hydroxyethyl); and N,N-dialkyl acrylamide or methacrylamide (where the alkyl group is that having a carbon number of 1 to 10, such as methyl, ethyl, butyl, isobutyl, ethylhexyl or cyclohexyl).

As the other copolymerization monomer, there can also be used: unsaturated carboxylic acids such as acrylic acid, methacrylic acid, vinylacetic acid, vinylsulfonic acid, maleic acid, fumaric acid, crotonic acid, itaconic acid and cinnamic acid; carboxyl-containing unsaturated carboxylic acid esters such as 2-carboxyethyl(meth)acrylate, 2-carboxypropyl(meth)acrylate, 3-carboxypropyl(meth)acrylate and 4-carboxybutyl (meth)acrylate; maleimide; acrylonitrile; methacrylonitrile; maleylonitrile; alkoxysilyl-containing vinyl silane; and allyloxyethanol.

In the present invention, it is preferable use at least one kind of copolymerization monomer selected from the acrylic esters, fluorine-containing acrylic esters, methacrylic esters, fluorine-containing methacrylic esters, styrenic compounds and fluorine-containing styrenic compounds, more preferably acrylic ester, fluorine-containing acrylic ester, methacrylic ester or fluorine-containing methacrylic ester, still more preferably acrylic ester or methacrylic ester, for production of the fluorine-containing polymer having the repeating unit (a) of the general formula (2).

Although any of the above copolymerizable monomers can be used without particular limitation, the copolymerization monomer is preferably formed from an alkyl group, fluorine-containing alkyl group, monocyclic or polycyclic alicyclic hydrocarbon group, fluorine-containing alicyclic hydrocarbon group, cyclic ether group or lactone group in view of the use in the resist step of the semiconductor manufacturing process. Further, the copolymerization monomer is preferably free of a multiple bond or aromatic ring other than the polymerizable double bond required to form the chain skeleton of the polymer.

As the "other monomer", one kind or a combination of two or more kinds of the above copolymerization monomers can be used.

The fluorine-containing polymer of the present invention does not necessarily has any repeating unit based on the "other monomer". In the case where the fluorine-containing polymer has any repeating unit based on the "other monomer", the ratio of the repeating unit based on the "other monomer" is preferably 70 mol % or less, more preferably 40 mol % or less, still more preferably 30 mol % or less, with respect to the total repeating units of the fluorine-containing polymer. When the ratio of the repeating unit based on the other monomer exceeds 70 mol %, the methide group does not impart sufficient acidity. Various effects can be obtained when the ratio of the repeating unit based on the other monomer is more than or equal to the lower limit of the above-specified range.

The fluorine-containing polymer of the present invention has a weight-average molecular weight of 1,000 to 1,000,000, preferably 2,000 to 500,000, more preferably 2,000 to 100,000, as measured by gel permeation chromatography (GPC). When the weight-average molecular weight of the polymer is less than 1,000, the coating film of the polymer may be sufficient in strength. When the weight-average molecular weight of the polymer exceeds 1,000,000, the solubility of the polymer in the solvent unfavorably decreases so that it is difficult to form the coating film smoothly. Further, the molecular weight distribution (Mw/Mn) of the polymer is preferably 1.01 to 5.00, more preferably 1.01 to 4.00, still more preferably 1.01 to 3.00, most preferably 1.10 to 2.50.

[Production Method of Fluorine-Containing Polymer]

There is no particular restriction on the method for production of the fluorine-containing polymer in the present invention. Although the fluorine-containing polymer can be produced by a common method, it is preferable to adopt a radical polymerization process, an ionic polymerization process or the like. In some cases, a coordinate anionic polymerization process, a living anionic polymerization process, a cationic polymerization process, a ring-opening metathesis polymerization process, a vinylene polymerization process, a vinyl addition process or the like may be adopted.

The radical polymerization process can be performed by a known polymerization technique such as bulk polymerization, solution polymerization, suspension polymerization or emulsion polymerization in the presence of a radial polymerization initiator or radial generator in either a batch system, a semi-continuous system or a continuous system.

There is no particular restriction on the radial polymerization initiator. Examples of the radial polymerization initiator are azo compounds, peroxide compounds and redox compounds. Among others, azobisisobutyronitrile, tert-butylperoxypivalate, di-tert-butyl peroxide, i-butyryl peroxide, lauroyl peroxide, succinic peroxide, dicinnamyl peroxide, di-n-propylperoxycarbonate, tert-butylperoxyallylmonocarbonate, benzoyl peroxide, hydrogen peroxide and ammonium persulphate are particularly preferred.

There is also no particular restriction on the reactor used for the polymerization reaction. Further, the polymerization reaction may be performed with the use of a polymerization solvent. The polymerization solvent is preferably the one that does not inhibit the polymerization reaction. Typical examples of the polymerization solvent are: ester solvents such as ethyl acetate and n-butyl acetate; ketone solvents such as acetone and methyl isobutyl ketone; hydrocarbon solvents such as toluene and cyclohexane; and alcohol solvents such as methanol, isopropyl alcohol and ethylene glycol monomethyl ether. There can also be used water, ether solvents, cyclic ether solvents, from solvents and aromatic solvents. These solvents can be used solely or in the form of a mixture of two or more thereof. A molecular weight controlling agent such as mercaptan may also be used in combination. The reaction temperature of the polymerization reaction is controlled as appropriate depending on the kind of the radial polymerization initiator or radical generator and is generally preferably 20 to 200° C., more preferably 30 to 140° C.

As a technique for removing water or organic solvent from the resulting solution or dispersion system of the fluorine-containing polymer, it is feasible to adopt reprecipitation, filtration or distillation by heating under reduced pressure etc.

[Antistatic Agent]
[Solvent]

The antistatic agent of the present invention is produced by dissolving the above-mentioned fluorine-containing polymer in the solvent. The solvent is thus contained in the antistatic agent. The antistatic agent in which the fluorine-containing polymer is dissolved in the organic solvent is used to form a coating film of the polymer by application and drying. There is no particular restriction on the organic solvent used as long as the fluorine-containing polymer is soluble in the organic solvent. Examples of the organic solvent are: ketone solvents such as acetone, methyl ethyl ketone, cyclohexanone, methyl isoamyl ketone and 2-heptanone; polyhydric alcohol solvents or derivatives thereof, such as ethylene glycol, ethylene glycol monoacetate, diethylene glycol, diethylene glycol monoacetate, propylene glycol, propylene glycol monoacetate, dipropylene glycol and monomethyl ether, monoethyl ether, monopropyl ether, monobutyl ether or monophenyl ether of dipropylene glycol monoacetate; cyclic ether solvents such as dioxane; ester solvents such as methyl lactate, ethyl lactate, methyl acetate, ethyl acetate, butyl acetate, methyl pyruvate, ethyl pyruvate, methyl methoxypropionate and ethyl ethoxypropionate; aromatic solvents such as xylene and toluene; and fluorine-containing solvents such as foon, alternative flon, perfluoro compound and hexafluoroisopropyl alcohol. There can also be used high-boiling-point weak solvents such as Turpen-based petroleum naphtha solvents or paraffinic solvents for the purpose of increasing the applicability of the antistatic agent. These solvents can be used solely or in the form of a mixture of two or more thereof.

The concentration of the fluorine-containing polymer of the general formula (2) in the solution can be controlled as appropriate, depending on the kind and amount of the other additive, so as to obtain the uniform solution and is generally 0.01 to 50 mass %, preferably 0.1 to 30 mass %, more preferably 1 to 20 mass %.

[Additive for Improvement of Film Formation]

In order to control the film forming property of the antistatic agent and the strength of the resulting coating film, any other polymer compound or film-forming property improving agent may be added. Examples of the other polymer compound are polyolefinic polymers, polystyrenic polymers, polyamide polymers, polyvinyl chloride polymers, polyacetal polymers, polyester polymers, polyurethane polymers, polycarbonate polymers, acrylate/methacrylate polymers, polyacrylonitrile polymers, thermoplastic elastomer polymers, unsaturated polyester polymers, epoxy polymers, diarylphthalate polymers, melamine polymers, liquid crystalline polyester polymers, fluoro polymers, polysulfone polymers, polyphenylene ether polymers, polyimide polymers and silicone polymers. As the elastomer, there can be used natural rubber, isoprene rubber, butadiene rubber, styrene-butadiene rubber, butyl rubber, ethylene-propylene-diene rubber, ethylene-propylene rubber, chloroprene rubber, acrylonitrile-butadiene rubber, chlorosulfonated polyethylene rubber, silicone rubber, fluoro rubber and urethane.

[Cation]

In the present invention, the fluorine-containing polymer of the antistatic agent can be that in which $M^+$ of the general formula (2) is $H^+$ as mentioned above. However, the coexistence of either the metal ion or quaternary ammonium cation enables improvement in the antistatic effect of the fluorine-containing polymer.

The metal that gives the metal ion can be selected as appropriate from those soluble in the solvent of the antistatic agent.

In view of the solubility, it is preferable to use alkali metal such as lithium, sodium or potassium. The metal can be used in the form of a hydroxide, an oxide, a nitrate, a chloride or an organic acid salt such as acetate or oxalate thereof.

The quaternary ammonium cation can a cation of the following general formula (15).

[Chem. 37]

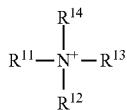

(15)

In the general formula (15), $R^{11}$ to $R^{14}$ each independently represent a substituted or unsubstituted $C_1$-$C_{20}$ alkyl group or aryl group.

Examples of the alkyl group as $R^{11}$ to $R^{14}$ are linear, branched or cyclic alkyl groups, such as methyl, ethyl, n-propyl, i-propyl, n-butyl, n-pentyl, n-hexyl, n-decyl, cyclopentyl, cyclohexyl, cycloheptyl, norbornyl and adamantyl.

Examples of the substituent of the alkyl group are halogen atoms (preferably, fluorine), oxo groups, alkylene oxide groups, alkanoyl groups, alkanoyloxy groups, alkanoylamide groups, carboxyl groups, alkoxycarbonyl groups, haloalkylcarbonyl groups, alkoxy groups, haloalkoxy groups, amino groups, alkylamino groups, dialkylamino groups, cyclic amino groups, alkylaminocarbonyl groups, carbamoyl groups, hydroxyl group, nitro group, cyano group, mercapto groups, alkylthio groups, alkylsulfonyloxy groups, alkylsulfonylamino groups and substituted or unsubstituted phenyl group (in which the substituent is a $C_1$-$C_{10}$ linear, branched or cyclic alkyl group).

In particular, the quaternary ammonium cation of the above chemical formula (15) is preferably that in which three of $R^{11}$ to $R^{14}$ are methyl and the other one of $R^{11}$ to $R^{14}$ is a $C_4$-$C_{20}$ alkyl group or aryl group that may have a substituent. In such an ammonium cation, a positive charge on the nitrogen atom can be stabilized by three, strong electron-donating methyl groups.

Preferred examples of the quaternary ammonium cation are: alkyltrimethylammonium salt $RN^+(CH_3)_3X^-$; dialkyldimethylammonium salt $RRN^+(CH_3)_2X^-$; and alkylbenzyldimethylammonium salt $RN^+(CH_2Ph)(CH_3)_2X^-$. Herein, Ph represents a phenyl group; and R represents any arbitrary alkyl group as specified above.

In the antistatic agent of the present invention, a hydroxyl group is preferred as a counter ion of the quaternary ammonium cation. Examples of the resulting quaternary ammonium salt are tetramethylammonium hydroxide, tetraethylammonium hydroxide, tetrapropylammonium hydroxide, tetrahexylammonium hydroxide, tris(hydroxyethyl)methylammonium hydroxide, hexadecyltrimethylammonium hydroxide, benzyltrimethylammonium hydroxide, phenyltrimethylammonium hydroxide, benzyltriethylammonium hydroxide and 3-(trifluoromethyl)phenyltrimethylammonium hydroxide.

[Antistatic Aid]

The antistatic agent of the present invention may additionally contain a known antistatic material such as polyether block polyolefin copolymer, polyoxyalkylene copolymer, polyetheresteramide copolymer or ethylene oxide-propylene oxide-allyl glycidyl copolymer.

This polymer-type antistatic material has an ether bond in its molecule. As a result, the ionic salt becomes more stable in the presence of an oxygen atom of the ether bond etc. so as to further reduce the electrical resistance of the antistatic coating film. In addition, the compatibility between the additives of the antistatic agent can be increased in the presence of a structal moiety other than the ether bond in the polymer block so as to thereby improve the adhesion of the antistatic coating film to the substrate material and the durability of the antistatic coating film.

Herein, the polymer-type antistatic material can be contained in an amount of 0.05 to 30 parts by mass per 100 parts by weight of the fluorine-containing polymer of the general formula (2).

[Other Additives]

There can be used any known additive such as an antioxidant, a heat stabilizer, a UV absorber, a fire retardant, a fireproofing aid, a coloring agent, a pigment, an antibacterial agent or fungicide, a lightfastness agent, a plasticizer, a tackifier, a dispersant, an antifoaming agent, a curing catalyst, a curing agent, a leveling agent, a coupling agent, a filler, a vulcanization agent, a vulcanization accelerator, an organic peroxide, a cross-linking aid and/or a photopolymerization initiator, as required, as an agent for modifying the film forming property of the antistatic agent of the present invention.

EXAMPLES

The present invention will be described in more detail below by way of the following examples. It should be noted that these examples are illustrative and are not intended to limit the present invention thereto.

Herein, $^1$H NMR chemical shifts σ were measured, for a sample dissolved in a solvent, in ppm with respect to the internal standard (based on the peak of tetramethylsilane as 0 ppm) using a nuclear magnetic resonance spectrometer "AL-400" (400 MHz) manufactured by JEOL Ltd. Splitting patters are denoted as s for singlet, d for doublet and m for multiplet. Further, $^{19}$F NMR chemical shifts σ were measured, for a sample dissolved in a solvent, in ppm with respect to the internal standard (based on the peak of trichlorofluoromethane as 0 ppm) using a nuclear magnetic resonance spectrometer "AL-400" (376 MHz) manufactured by JEOL Ltd.

The molecular weight (number-average molecular weight Mn) and molecular weight distribution (ratio of weight-average molecular weight Mw to Mn, Mw/Mn) of a resin composition were measured using a GPC apparatus "HLC-8320GPC" manufactured by Tosoh Corporation, in which a column "ALPHA-M" and a column "ALPHA-2500" both manufactured by Tosoh Corporation were connected in series, and using dimethylformamide (containing 0.03 mol/L lithium bromide and 0.01 mol/L phosphoric acid) as a developing solvent. As a detector of the apparatus, a differential refraction index detector was used.

The surface resistance (Ω/□) of a coating film was measured according to JIS K6911 using a resistance meter "4329A" manufactured by Yokokawa Hewlett Packard Inc. with an electrode "16008A" also manufactured by Yokokawa Hewlett Packard Inc. connected thereto.

The thickness of a coating film on a substrate was measured using an interference film thickness probe "FTP500" manufactured by Sentech Corp.

Synthesis of 3-Methacryloxy-1,1-Bis(Trifluoromethanesulfonyl)Butyric Acid

[Chem. 38]

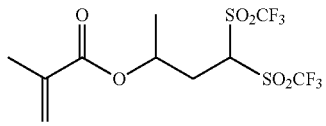

Into a 100-mL three-neck flask equipped with a reflux condenser, 10 g (0.0030 mol) of 3-hydroxy-1,1-bis(trifluoromethanesulfonyl)butyric acid (ABMD), 35 g of toluene, 0.28 g (0.0030 mol) of methanesulfonic acid and 0.05 g (0.5 parts by mass relative to ABMD) of 2,2-methylene-bis(4-methyl-6-tert-butylphenol) (available as "Nonflex MBP" from Seiko Chemical Co., Ltd.) were charged under a nitrogen atmosphere. The reactor was cooled with ice. While keeping the inside temperature of the reactor at 7 to 10° C., methacrylic anhydride (MAAH) was dropped into the reactor over 10 minutes. After the completion of the dropping, the mixture in the reactor was stirred for 3.5 hours while heating the reactor at 70° C. After the completion of the heating, the reactor was cooled down to room temperature. The resulting reaction mixture was admixed with 30 g of toluene and washed twice with 35 g of water. After the washing, the reaction mixture was dehydrated by azeotropic distillation with toluene, admixed with 0.123 g of Nonflex MBP, and then, subjected to distillation under reduced pressure. With this, 3-methacryloxy-1,1-bis(trifluoromethanesulfonyl)butyric acid (MA-ABMD) was distillated at 83 to 86° C. under a reduced pressure of 70 Pa. In total, 9.29 g of MA-ABMD was obtained (yield: 77.2%).

[Physical Properties of MA-ABMD]
$^1$H NMR (solvent: deutrated chloroform); σ=6.13 (s, 1H), 5.66 (s, 1H), 5.58 (m, 1H), 5.22 (dd, 1H), 2.71 (m, 2H), 1.94 (s, 3H), 1.42 (d, 3H).
$^{19}$F NMR (solvent: deutrated chloroform); σ=73.4

Resin Composition Preparation Example 1

Within a glass flask, 1.00 g of MA-ABMD was dissolved and mixed in 4.0 g of 2-butanone. To this liquid, added as a polymerization initiator was 0.02 g of tert-butyl peroxypivalate (available under the trade name of "Perbutyl PV" from Nippon Oil & Fat Co., Ltd. as a 71 mass % solution in Shellsole (available from Shell Chemical Co.)). The mixed liquid was subjected to degassing with stirring, followed by introducing thereto a nitrogen gas. The resulting liquid was reacted at 60° C. for 16 hours. Then, 100 g of n-heptane was added to the reaction terminated liquid to form a white precipitate. The precipitate was filtered out and dried under reduced pressure at 75° C., thereby yielding 0.80 g of a white solid substance. The GPC measurement results were as follows: Mn=33,000; and Mw/Mn=2.3.

Resin Composition Preparation Example 2

Within a glass flask, 0.28 g (0.0007 mol) of MA-ABMD and 0.72 g (0.0063 mol) of ethyl methacrylate were dissolved and mixed in 4.0 g of 2-butanone. To this liquid, added as a polymerization initiator was 0.10 g of Perbutyl PV (71 mass % solution in Shellsole). The mixed liquid was subjected to degassing with stirring, followed by introducing thereto a nitrogen gas. The resulting liquid was reacted at 60° C. for 16 hours. Then, 100 g of n-heptane was added to the reaction terminated liquid to form a white precipitate. The precipitate was filtered out and dried under reduced pressure at 75° C., thereby yielding 0.72 g of a white solid substance. The GPC measurement results were as follows: Mn=11,000; and Mw/Mn=1.9.

Resin Composition Preparation Example 3

Within a glass flask, 0.60 g (0.0015 mol) of MA-ABMD and 0.40 g (0.0035 mol) of ethyl methacrylate were dissolved and mixed in 4.0 g of 2-butanone. To this liquid, added as a polymerization initiator was 0.07 g of Perbutyl PV (71 mass % solution in Shellsole). The mixed liquid was subjected to degassing with stirring, followed by introducing thereto a nitrogen gas. The resulting liquid was reacted at 60° C. for 16 hours. Then, 100 g of n-heptane was added to the reaction terminated liquid to form a white precipitate. The precipitate was filtered out and dried under reduced pressure at 75° C., thereby yielding 0.81 g of a white solid substance. The GPC measurement results were as follows: Mn=16,000; and Mw/Mn=1.8.

Resin Composition Preparation Example 4

Within a glass flask, 0.56 g (0.0014 mol) of MA-ABMD and 0.44 g (0.0020 mol) of 1-adamantyl methacrylate were dissolved and mixed in 4.0 g of 2-butanone. To this liquid, added as a polymerization initiator was 0.07 g of Perbutyl PV (71 mass % solution in Shellsole). The mixed liquid was subjected to degassing with stirring, followed by introducing thereto a nitrogen gas. The resulting liquid was reacted at 60° C. for 16 hours. Then, 100 g of n-heptane was added to the reaction terminated liquid to form a white precipitate. The precipitate was filtered out and dried under reduced pressure at 75° C., thereby yielding 0.72 g of a white solid substance. The GPC measurement results were as follows: Mn=20,000; and Mw/Mn=2.0.

Example 1

A uniform solution was prepared by dissolving 0.050 g of the white solid substance prepared in Resin Composition Preparation Example 1 in 1.00 g of propylene glycol monomethyl ether acetate (PGMEA). This solution was spin-casted on a native oxide-covered silicon substrate (cut surface: (000) plane, thickness: 520 μm) using a spin coater ("1H-360S" manufactured by Mikasa Co., Ltd) at a rotation rate of 1500 rpm and then dried at 90° C. for 1 minute under the flow of a nitrogen gas, thereby forming a coating film with a thickness of 400 nm.

Example 2

A uniform solution was obtained by dissolving 0.050 g of the white solid substance prepared in Resin Composition Preparation Example 2 in 1.00 g of PGMEA and adding thereto with stirring 0.008 g of tetramethylammonium hydroxide pentahydrate. This solution was spin-casted on the same native oxide-covered silicon substrate as used in Example 1 using a spin coater at a rotation rate of 1000 rpm and then dried at 90° C. for 1 minute under the flow of a nitrogen gas, thereby forming a coating film with a thickness of 240 nm.

Example 3

A uniform solution was obtained by dissolving 0.050 g of the white solid substance prepared in Resin Composition Preparation Example 3 in 1.00 g of PGMEA and adding thereto with stirring 0.018 g of tetramethylammonium hydroxide pentahydrate. This solution was spin-casted on the same native oxide-covered silicon substrate as used in Example 1 using a spin coater at a rotation rate of 1000 rpm and then dried at 90° C. for 1 minute under the flow of a nitrogen gas, thereby forming a coating film with a thickness of 240 nm.

Example 4

A uniform solution was obtained by dissolving 0.050 g of the white solid substance prepared in Resin Composition Preparation Example 4 in 1.00 g of PGMEA and adding thereto with stirring 0.012 g of tetramethylammonium hydroxide pentahydrate. This solution was spin-casted on the same native oxide-covered silicon substrate as used in Example 1 using a spin coater at a rotation rate of 1000 rpm and then dried at 90° C. for 1 minute under the flow of a nitrogen gas, thereby forming a coating film with a thickness of 240 nm.

Comparative Example 1

Within a glass flask, 1.0 g of ethyl methacrylate was dissolved in 4.0 g of butanone. To this liquid, added as a polymerization initiator was 0.03 g of Perbutyl PV (71 mass % solution in Shellsole). The mixed liquid was subjected to degassing with stirring, followed by introducing thereto a nitrogen gas. The resulting liquid was reacted at 60° C. for 16 hours. Then, 100 g of n-heptane was added to the reaction terminated liquid to form a white precipitate. The precipitate was filtered out and dried under reduced pressure at 75° C., thereby yielding 0.70 g of a white solid substance. A uniform solution was obtained by dissolving 0.050 g of the yielded solid substance in 1.00 g of PGMEA. This solution was spin-casted on the same native oxide-covered silicon substrate as used in Example 1 using a spin coater at a rotation rate of 1000 rpm and then dried at 90° C. for 1 minute under the flow of a nitrogen gas, thereby forming a coating film with a thickness of 240 nm.

The surface resistance of the coating films of Example 1 to 4 and Comparative Example 1 are indicated in TABLE 1.

TABLE 1

| | Surface Resistance ($\Omega/\square$) |
|---|---|
| Example 1 | $8 \times 10^{12}$ |
| Example 2 | $2 \times 10^{11}$ |
| Example 3 | $9 \times 10^{13}$ |
| Example 4 | $2 \times 10^{13}$ |
| Comparative Example 1 | $1 \times 10^{17}$ |

As is apparent from TABLE 1, the coating film of the antistatic agent containing the fluorine-containing polymer of the present invention had much lower surface resistance than that of the resin coating film of Comparative Example and exerted antistatic effect over a long time.

The invention claimed is:

1. A fluorine-containing polymer comprising a repeating unit of the general formula (2) and produced by homopolymerization or copolymerization with another polymerizable double bond-containing monomer

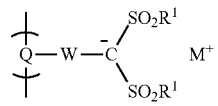
(2)

where W represents a divalent linking group of the general formula (3)

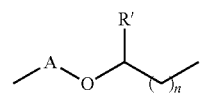
(3)

n represents an integer of 1 to 3;

R' represents a methyl group, an ethyl group, a n-propyl group, an isopropyl group, a trifluoromethyl group, a 2,2,2-trifluoroethyl group, a hexafluoroisopropyl group, a cyclopentyl group, a cyclohexyl group, a cycloheptyl group, a norbornyl group or a adamantyl group;

A is represented by $B^1$-$B^2$-$B^3$;

$B^1$ represents a single bond or a group selected from the following groups;

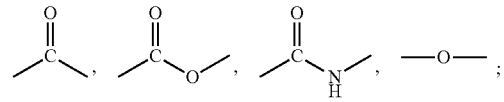

$B^2$ represents a single bond; a linear, branched or cyclic alkylene group; or a group in which a linear or branched alkylene group and a cyclic alkylene group are bonded in series,
wherein the linear, branched or cyclic alkylene group or the group in which the linear or branched alkylene group and the cyclic alkylene group are bonded in series may have a carbonyloxy group or an amide bond inserted therein and all or some of the hydrogen atoms of the linear, branched or cyclic alkylene group may be substituted with fluorine;

$B^3$ represents a single bond or a group selected from the following groups:

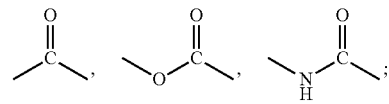

$R^1$ each independently represents a perfluoroalkyl group;

Q represents a unit structure formed by cleavage of a double bond of a polymerizable double bond-containing group; and $M^+$ represents a hydrogen cation, a metal ion or a quaternary ammonium ion of the general formula (15)

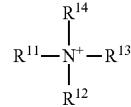
(15)

where $R^{11}$ to $R^{14}$ each independently represent a substituted or unsubstituted $C_1$-$C_{20}$ alkyl or aryl group.

2. The fluorine-containing polymer according to claim 1, wherein Q represents a unit structure of the general formula (6)

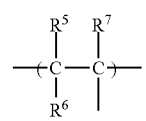
(6)

where $R^5$, $R^6$ and $R^7$ each independently represent a hydrogen atom, a halogen atom, a $C_1$-$C_4$ linear, branched or cyclic alkyl group or a cyano group; any of $R^5$, $R^6$ and $R^7$ may be bonded together to form an alicyclic ring structure; and all or some of the hydrogen atoms of the alkyl group or the alicyclic ring structure may be substituted with fluorine or hydroxyl.

3. The fluorine-containing polymer according to claim 1, wherein Q represents a unit structure formed by cleavage of a polymerizable double bond of any one polymerizable double bond-containing group selected from the following groups:

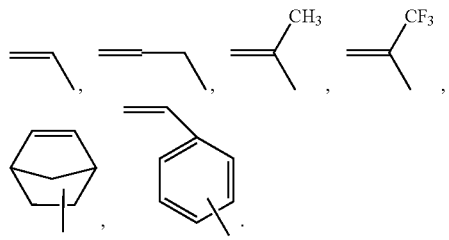

4. The fluorine-containing polymer according to claim 1, which is produced by copolymerization of a fluorine-containing monomer of the general formula (1) with at least one monomer selected from the group consisting of acrylic esters, fluorine-containing acrylic esters, methacrylic esters, fluorine-containing methacrylic esters, styrenic compounds, fluorine-containing styrenic compounds, vinyl ethers, fluorine-containing vinyl ethers, allyl ethers, fluorine-containing allyl ethers, acrylamides, methacrylamides, vinyl esters, allyl esters, olefins, fluorine-containing olefins, norbornene compounds, fluorine-containing norbornene compounds, sulfur dioxide and vinyl silanes

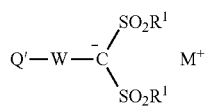
(1)

where W and $R^1$ are the same as defined in the general formula (2); and Q' represents the polymerizable double bond-containing group that forms the unit structure Q.

5. An antistatic agent comprising at least the fluorine-containing polymer according to claim 1 and a solvent.

6. The antistatic agent according to claim 5,
wherein, in the fluorine-containing polymer, M⁺ of the general formula (2) is the hydrogen cation; and
wherein the antistatic agent further comprises a quaternary ammonium ion of the general formula (15)

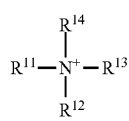
(15)

where $R^{11}$ to $R^{14}$ each independently represent a substituted or unsubstituted $C_1$-$C_{20}$ alkyl group or aryl group.

7. The antistatic agent according to claim 6, wherein the quaternary ammonium ion is a cation derived from a quaternary ammonium hydroxide.

8. An article having a surface to which the antistatic agent according to claim 5 is applied to exert an antistatic effect.

9. A fluorine-containing polymer comprising a repeating unit of the following general formula:

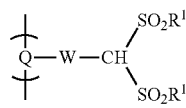

where W represents a divalent linking group of the general formula (3)

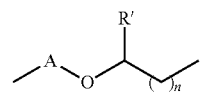
(3)

n represents an integer of 1 to 3;
R' represents a methyl group, an ethyl group, a n-propyl group, an isopropyl group, a trifluoromethyl group, a 2,2,2-trifluoroethyl group, a hexafluoroisopropyl group, a cyclopentyl group, a cyclohexyl group, a cycloheptyl group, a norbornyl group or an adamantyl group;
A is represented by $B^1$-$B^2$-$B^3$;
$B^1$ represents a single bond or a group selected from the following groups;

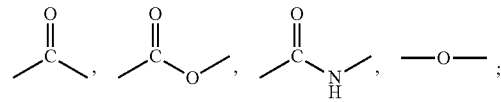

$B^2$ represents a single bond; a linear, branched or cyclic alkylene group; or a group in which a linear or branched alkylene group and a cyclic alkylene group are bonded in series,
wherein the linear, branched or cyclic alkylene group or the group in which the linear or branched alkylene group and the cyclic alkylene group are bonded in series may have a carbonyloxy group or an amide bond inserted therein and all or some of the hydrogen atoms of the linear, branched or cyclic alkylene group may be substituted with fluorine;
$B^3$ represents a single bond or a group selected from the following groups:

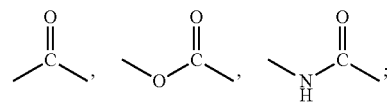

$R^1$ each independently represents a perfluoroalkyl group; and
Q represents a unit structure formed by cleavage of a double bond of a polymerizable double bond-containing group.

* * * * *